United States Patent
Tano et al.

(10) Patent No.: US 6,438,472 B1
(45) Date of Patent: *Aug. 20, 2002

(54) OPERATION CONTROL SYSTEM CAPABLE OF ANALYZING DRIVING TENDENCY AND ITS CONSTITUENT APPARATUS

(75) Inventors: Michiyasu Tano, Tokyo; Toshio Daimon, Chiba, both of (JP)

(73) Assignees: Data Tec. Co., Ltd., Tokyo; The Tokio Marine Risk Consulting Co., Ltd., Chiba, both of (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/601,562
(22) PCT Filed: Dec. 7, 1999
(86) PCT No.: PCT/JP99/06848
§ 371 (c)(1), (2), (4) Date: Oct. 13, 2000
(87) PCT Pub. No.: WO00/34742
PCT Pub. Date: Jun. 15, 2000

(30) Foreign Application Priority Data

Sep. 12, 1998 (JP) ............................................. 10-350585

(51) Int. Cl.[7] .............................. B60Q 1/50; G06F 17/40
(52) U.S. Cl. .......................... 701/35; 701/36; 701/200; 701/25
(58) Field of Search ............................ 701/35, 36, 200, 701/1, 25, 209

(56) References Cited

U.S. PATENT DOCUMENTS

| | | | | |
|---|---|---|---|---|
| 5,446,659 A | * | 8/1995 | Yamawaki | 701/29 |
| 5,546,306 A | * | 8/1996 | Hirabayashi et al. | 701/35 |
| 5,862,500 A | * | 1/1999 | Goodwin | 701/35 |
| 6,067,488 A | * | 5/2000 | Tano | 701/35 |

FOREIGN PATENT DOCUMENTS

WO    WO 95/05649    2/1995

OTHER PUBLICATIONS

Patent Abstracts of Japan Publication No. 10086861, entitled Driving Recorder, By Iwashita Kimie, published Jul. 4, 1998.

* cited by examiner

Primary Examiner—William A. Cuchlinski, Jr.
Assistant Examiner—Olga Hernandez
(74) Attorney, Agent, or Firm—Bachman & LaPointe, P.C.

(57) ABSTRACT

An operation control system includes a data recorder for recording data representing the features of behavior of a vehicle in a memory card and an operation control assisting apparatus for analyzing the driving tendency of the vehicle. The operation control assisting apparatus reads measurement data out of the memory card, classifies the measurement data into a set of data about the low-speed range, a set of data about the intermediate-speed range, and a set of data about the high-speed range, extracts behavior features in each speed range from the classified measurement data, and creates judgment information for judging the driving tendency by a driver of the vehicle in an ex post facto way based on the results of the extract.

20 Claims, 17 Drawing Sheets

FIG. 7

| 10h | sts | SPEED | ALTITUDE | LATITUDE | LONGITUDE |
|---|---|---|---|---|---|

| 11h | NO. OF TELEMETRY SATELLITES | YEAR | MONTH | DAY | HR | MIN | SEC | – | DIRECTION | DOP | – |
|---|---|---|---|---|---|---|---|---|---|---|---|

FIG. 8

| 12h | – | – | DRIVING DISTANCE | LATITUDE | LONGITUDE |
|---|---|---|---|---|---|

| 13h | – | YEAR | MONTH | DAY | HR | MIN | SEC | – | STATUS | – | – |
|---|---|---|---|---|---|---|---|---|---|---|---|

FIG. 9

| 20h | – | A x –MAX. | A x AVG. | A x +MAX. | p –MIN. | p AVG. | p +MAX. | VEHICLE SPEED MIN. |
|---|---|---|---|---|---|---|---|---|
| 21h | – | A y –MAX. | A y AVG. | A y +MAX. | q –MIN. | q AVG. | q +MAX. | VEHICLE SPEED AVG. |
| 22h | – | A z –MAX. | A z AVG. | A z +MAX. | r –MIN. | r AVG. | r +MAX. | VEHICLE SPEED MAX. |

FIG. 10

| 02h | sts | SPEED MIN. | SPEED AVG. | SPEED MAX. | LATITUDE | LONGITUDE |
|---|---|---|---|---|---|---|

LOCATION POSITIONING DATA NEAREST TO CENTER

FIG. 12

INITIAL SETUP

| | | |
|---|---|---|
| VEHICLE TYPE | DATA TEC | |
| DRIVER | JOHN DOE | |
| VEHICLE PULSE SCALE FACTOR | 400 | mm |
| AGGREGATE INTERVAL | 30 | SEC |
| DRIVING DISTANCE DURING AGGREGATE INTERVAL | 520 | cm |
| EVENT RECORD TIME BEFORE | 30 | SEC |
| AFTER | 30 | SEC |
| MAX. NO. OF EVENTS | 255 | EVENTS |

FIG. 13

BAD HABIT THRESHOLD

QUICK START

QUICK START FROM STOP STATE
                AT ACCELERATION OF OVER    0.35 G

QUICK START FROM CONSTANT SPEED
                ACCELERATE FROM DRIVING STATE
                AT ACCELERATION OF OVER    0.20 G

QUICK BRAKE

DECELERATE FROM DRIVING STATE
                AT ACCELERATION OF OVER    −0.50 G

HANDLING (TURN)

LATERAL ACCELERATION OF OVER    0.50 G

FIG. 14

DANGEROUS BEHAVIOR THRESHOLD

---

QUICK START

ACCELERATE FROM STOP STATE AT OVER [ 0.30 ] G AND THEN CONTINUE AT ACCELERATION OF OVER [ 0.20 ] G FOR OVER [ 5.0 ] SEC

---

QUICK BRAKE IMMEDIATELY AFTER START

IMMEDIATELY AFTER START FROM STOP STATE, STOP AT OVER [ − 0.70 ] G

---

QUICK TURN DURING START

TURN WITHIN [ 2 ] SEC AFTER START FROM STOP STATE, WITH LATERAL ACCELERATION OF OVER [ 0.35 ] G AND ANGULAR VELOCITY OF OVER [ 35.00 ] °/SEC

---

QUICK ACCELERATION FROM CONSTANT SPEED

FURTHER ACCELERATE AT OVER [ 0.25 ] G FOR MORE THAN [ 3.0 ] SEC DURING DRIVING AT CONSTANT SPEED

---

QUICK BRAKING

DECELERATE FROM DRIVING STATE AT OVER [ − 0.60 ] G

---

QUICK LANE CHANGE

CHANGE LANE FROM STRAIGHT DRIVING STATE AT LATERAL ACCELERATION OF OVER [ 0.20 ] G OR ANGULAR VELOCITY OF OVER [ 20.00 ] °/SEC

---

REPEATED LANE CHANGE

LATERAL ACCELERATION OF OVER [ 0.10 ] G OCCURRED [ 5 ] TIMES WITHIN [ 1 ] MIN DURING DRIVING

---

LANE CHANGE AFTER QUICK DECELERATION

AFTER DECELERATION OF OVER [ − 0.30 ] G FROM STRAIGHT DRIVING, CHANGE LANE AT LATERAL ACCELERATION OF OVER [ 02.0 ] G OR ANGULAR VELOCITY OF OVER [ 30.00 ] °/SEC

---

QUICK ACCELERATION DURING TURN

DURING TURN WITH LATERAL ACCELERATION OF OVER [ 0.50 ] G, ACCELERATE AT OVER [ 0.20 ] G

FIG. 23

OPERATION CONTROL
DAILY REPORT

| DATE | 1998.9.1 | PARK OUT TIME | 09:29 |
|---|---|---|---|
| NAME | ○○○ △ | PARK IN TIME | 17:45 |
| CAR ID | □□12◇3456 | DRIVING DISTANCE | 41.336km |

● OPERATION CONTROL

| SPEED | TOLL HIGHWAY | TOLL-FREE ROAD |
|---|---|---|
| AVG. SPEED | — | 30.7km/h |
| MAX. SPEED | — | 53km/h |

| DRIVING TIME | 01H, 31 M |
|---|---|
| TIME SPENT AT WORK | 08H, 16 M |
| MAX. CONTINUOUS DRIVING TIME | 00H, 11 M |

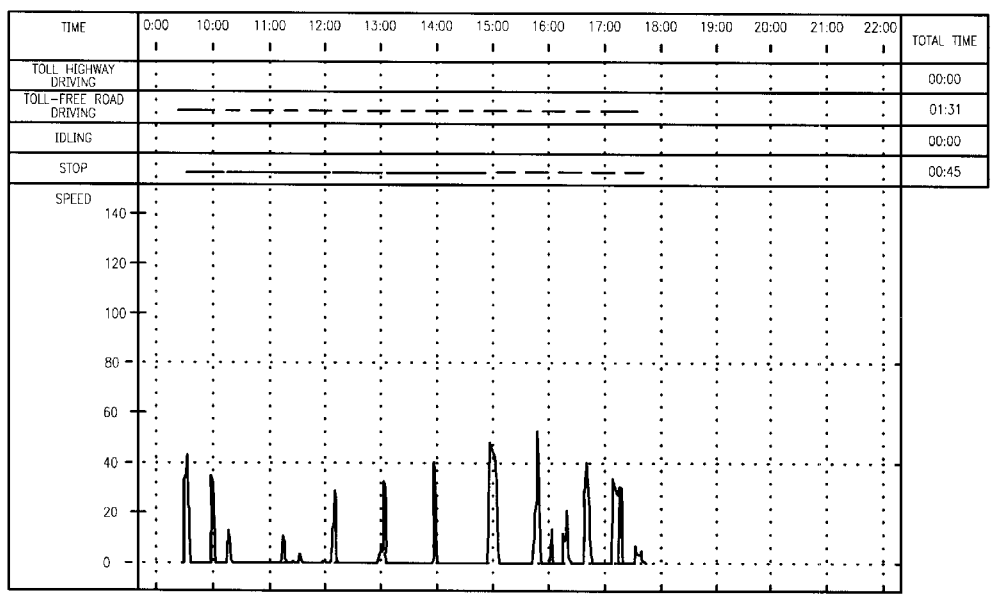

● MAINTENANCE

FUEL INCREASE PER 1KM TRAVELED

| CONSUMPTION INCREASE | |
|---|---|
| COST INCREASE | |

FUEL INCREASE UP TO CURRENT DRIVING

| COST INCREASE | |
|---|---|

| MAINTENANCE ITEMS | COST |
|---|---|
| | |
| TOTAL COST/ | |

FIG. 24

OPERATION CONTROL DAILY REPORT

| DATE | 1998.9.1 |
|---|---|
| NAME | ○○○ △ |
| CAR ID | □□12◇3456 |

● DRIVING STATUS GRAPH

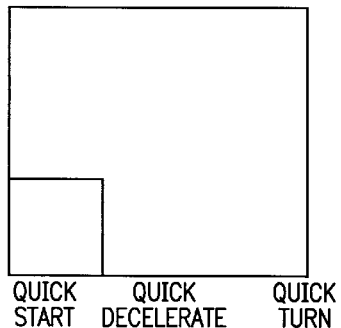

QUICK START    QUICK DECELERATE    QUICK TURN

| QUICK START | 01 TIMES |
|---|---|
| QUICK ACCELERATE | 00 TIMES |
| QUICK HANDLING | 00 TIMES |
| QUICK DECELERATE | 00 TIMES |
| HALT | 46 TIMES |
| : | |
| : | |

● SPEED HISTOGRAM

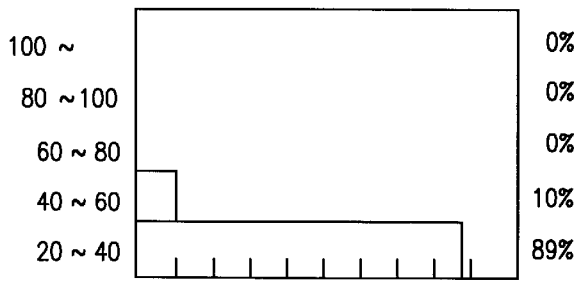

| 100 ~ | 0% |
| 80 ~ 100 | 0% |
| 60 ~ 80 | 0% |
| 40 ~ 60 | 10% |
| 20 ~ 40 | 89% |

● ACCELERATION HISTOGRAM

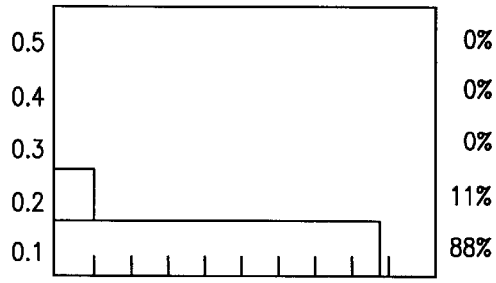

| 0.5 | 0% |
| 0.4 | 0% |
| 0.3 | 0% |
| 0.2 | 11% |
| 0.1 | 88% |

● DANGEROUS BEHAVIOR

| BEHAVIOR | TIME | COUNT | PLACE |
|---|---|---|---|
| QUICK TURN DURING START | 19:45:55 | 1 | URATA 4-CHOME, OHTA-KU, TOKYO |
| QUICK TURN DURING BRAKING | 17:13:29 | 1 | NISHIMINE-CHO, OHTA-KU, TOKYO |
| QUICK ACCELERATION DURING BREAKING | 17:50:12 | 1 | NISHIMINE-CHO, OHTA-KU, TOKYO |
| : | : | | |
| : | : | | |
| | | | |
| | | | |
| | | | |
| | | | |
| | | | |
| | | | |

FIG. 25

DANGEROUS BEHAVIOR
MONTHLY REPORT

| DATE | 1998.9.1 |
|---|---|
| NAME | ○○○ △ |

| DANGEROUS BEHAVIOR | DATE OCCURRED | TIME OCCURRED | PLACE |
|---|---|---|---|
| <QUICK TURN DURING START> | 1998/09/01 | 09:45:55 | YAGUCHI, OHTA-KU, TOKYO |
| <QUICK TURN DURING BRAKING> | 1998/09/01 | 17:13:29 | KAMINOGE, SETAGAYA-KU, TOKYO |
| <QUICK TURN DURING START> | 1998/09/03 | 09:37:34 | SETA, SETAGAYA-KU, TOKYO |
| <QUICK TURN DURING START> | 1998/09/03 | 14:08:18 | HISAMOTO, TAKATSU-KU, KAWASAKI-SHI, KANAGAWA |
| <QUICK ACCELERATION FROM CONSTANT SPEED> | 1998/09/03 | 15:04:50 | HISAMOTO, TAKATSU-KU, KAWASAKI-SHI, KANAGAWA |
| <QUICK TURN DURING BREAKING> | 1998/09/03 | 16:45:40 | HISAMOTO, TAKATSU-KU, KAWASAKI-SHI, KANAGAWA |
| <QUICK TURN DURING BREAKING> | 1998/09/03 | 16:46:29 | HISAMOTO, TAKATSU-KU, KAWASAKI-SHI, KANAGAWA |
| <QUICK TURN DURING START> | 1998/09/03 | 16:48:22 | HISAMOTO, TAKATSU-KU, KAWASAKI-SHI, KANAGAWA |
| <QUICK TURN DURING START> | 1998/09/04 | 09:18:10 | YOUGA, SETAGAYA-KU, TOKYO |
| <QUICK TURN DURING START> | 1998/09/04 | 09:34:38 | YOUGA, SETAGAYA-KU, TOKYO |
| <QUICK TURN DURING START> | 1998/09/04 | 11:18:46 | KAMIYOUGA 5-CHOME, SETAGAYA-KU, TOKYO |
| <QUICK TURN DURING START> | 1998/09/04 | 12:56:23 | KAMIYOUGA 6-CHOME, SETAGAYA-KU, TOKYO |
| <QUICK TURN DURING START> | 1998/09/04 | 14:14:42 | CHITOSEDAI 1-CHOME, SETAGAYA-KU, TOKYO |
| <QUICK TURN DURING START> | 1998/09/04 | 14:14:42 | CHITOSEDAI 2-CHOME, SETAGAYA-KU, TOKYO |
| <QUICK TURN DURING START> | 1998/09/04 | 14:15:02 | CHITOSEDAI 4-CHOME, SETAGAYA-KU, TOKYO |
| <QUICK TURN DURING START> | 1998/09/01 | 09:45:55 | TAKAIDO HIGASI 4-CHOME, SUGINAMI-KU, TOKYO |
| <QUICK TURN DURING BREAKING> | 1998/09/01 | 17:13:29 | TAKAIDO HIGASI 2-CHOME, SUGINAMI-KU, TOKYO |
| <QUICK TURN DURING START> | 1998/09/01 | 09:45:55 | TAKAIDO HIGASI 4-CHOME, SUGINAMI-KU, TOKYO |
| <QUICK TURN DURING BREAKING> | 1998/09/01 | 17:13:29 | TAKAIDO HIGASI 2-CHOME, SUGINAMI-KU, TOKYO |

DANGEROUS BEHAVIOR DETAIL GRAPH

FIG. 27
DANGEROUS BEHAVIOR DETAIL GRAPH

□□□ △△ (1998/09/02)

| DANGEROUS BEHAVIOR | TIME | PLACE | INDEX | REASON |
|---|---|---|---|---|
| QUICK TURN DURING START | 09:00:54 | URATA 4-CHOME, OHTA-KU, TOKYO | | |
| QUICK TURN DURING START | 09:01:15 | URATA 4-CHOME, OHTA-KU, TOKYO | | |
| QUICK TURN DURING START | 09:12:36 | URATA 4-CHOME, OHTA-KU, TOKYO | | |
| QUICK TURN DURING START | 12:56:04 | SHIN-URATA, OHTA-KU, TOKYO | | |
| QUICK TURN DURING START | 12:56:47 | SHIN-URATA, OHTA-KU, TOKYO | | |
| QUICK TURN DURING START | 14:40:38 | NISHIMINE-CHO, OHTA-KU, TOKYO | | |
| QUICK TURN DURING START | 14:45:39 | NISHIMINE-CHO, OHTA-KU, TOKYO | | |
| QUICK TURN DURING START | 16:35:22 | KAMINOGE, SETAGAYA-KU, TOKYO | | |
| QUICK TURN DURING START | 16:39:12 | SETA, SETAGAYA-KU, TOKYO | | |
| TOTAL COUNT | 9 | | | |
| QUICK TURN DURING BRAKING | 10:33:00 | URATA 4-CHOME, OHTA-KU, TOKYO | | |
| QUICK TURN DURING BRAKING | 16:26:20 | SETA, SETAGAYA-KU, TOKYO | | |
| TOTAL COUNT | 2 | | | |

OPERATION CONTROL SYSTEM CAPABLE OF ANALYZING DRIVING TENDENCY AND ITS CONSTITUENT APPARATUS

FIELD OF THE INVENTION

The present invention relates to an operation control system capable of analyzing, based on the driving data by vehicle and by driver thereof recorded in a recording medium, such as a memory card, the driving tendency of the driver and correlation between the driving tendency and the fuel consumption tendency, traffic accident, driver's fatigue, and so forth. More specifically, the present invention relates to a driving tendency analysis method that permits risk management associated with vehicle driving.

BACKGROUND OF THE INVENTION

When a traffic accident occurs, it is difficult for the third party other than person(s) involved in the accident to analyze its cause or situation in an ex post facto way. Normally, such analysis is made based on on-site circumstantial evidences and testimonies of the driver(s) and eyewitnesses. However, analysis of this type is, in large part, intuitive and generic in nature, and thus lacks accuracy. Thus, attempts have recently been made to reconstruct an accident situation by recording into a data recorder the data indicative of the vehicle's behavior and driving condition and using a computer unit to analyze this recorded data when an accident occurs. This data recorder has behavior sensors, such as angular velocity meter and accelerometer; an input device for inputting driving pulses, etc. from the speedometer and vehicle instrumentation; a nonvolatile memory; and its recording controller. The data measured by each sensor is recorded in the memory for a predetermined period of time, as updated as appropriate. When a traffic accident happens, the recorded data is read from the memory of this data recorder and analyzed. For example, the driving scene traced back for a certain period of time since the vehicle stopped after the accident is reconstructed by image processing and other operations performed by the computer. This objectively clarifies the situation at the time of the accident, so that causes of the accident are properly ascertained.

However, the data recorder was conventionally used for very limited purposes of reconstructing a situation of an accident if a traffic accident occurs. The current system that analyzes the data recorded in the data recorder, in most cases, performs analysis in fragments, based on a limited set of items, such as driving speed, acceleration and deceleration, without accounting for an actual accident situation. Thus, no consideration is given to comprehensive understanding of the driving tendency and its use in risk management for vehicle driving, and it is difficult to make them widely available for general drivers.

In companies and organizations, there may be cases where employees, or drivers, are responsible for creating a daily report that records the action history (Journal) from the driving start time to the driving end time in detail in order to daily manage the driving condition of the company-owned cars and verify the fuel consumption tendency of the company-owned cars. Normally, such daily reports are created in paper-based documents. The employees fill out a predefined form, with the driving interruption place (destination) and its time, fact of fuel replenishment, driving distance, and so forth. The information entered into the daily report is aggregated at predetermined intervals, and used as vehicle operation control information. However, it is burdensome to fill out the daily report form every day, and as the number of vehicles and drivers increases, the burden required to aggregate the daily reports also increases. Thus, there is a need for the development of technology that can make form fill-out and aggregation processes less burdensome, while securing useful information regarding vehicle operation.

Incidentally, when a driver drives a car, differences appear in features of behavior depending on the technique, personality, and habit of the driver, even for the same vehicle. Behavior features include, among other things, accelerating operation during driving, handling operation during turning, acceleration during stopping, and starting acceleration. Thus, traffic accidents could be prevented from happening, if the driver himself or the manager in the company objectively knows beforehand whether the individual driver has a safe driving tendency or a dangerous driving tendency that is likely to result in an accident.

Especially, for the manager in the company, by utilizing the information that is unknown from the daily report, risk management associated with vehicle operation could be achieved properly. Additionally, the correlation between the driving tendency and fuel consumption tendency, which may be intuitively understood but is not corroborated, may be ascertained beforehand. Based on this correlation, measures may be taken to minimize the amount of fuel consumption, thereby saving the vehicle operation cost.

Furthermore, if the data recorder may be utilized in the afore-mentioned applications, the data recorder and system that uses it are expected to find wider use in a variety of applications.

SUMMARY OF THE INVENTION

A main purpose of the present invention is to provide an operation control system capable of objectively analyzing the driving tendency of a vehicle on a driver-by-driver basis and constituent apparatus thereof.

The present invention provides: a data recorder mounted onboard a vehicle; an operation control assisting apparatus, in response to data recorded by the data recorder, for generating decision information indicative of driving tendency for each driver; a recording medium used to implement the operation control assisting apparatus in a computer; and an operation control system comprised thereof.

According to a first aspect of the present invention, there is provided a data recorder comprising: a media accommodating mechanism for detachably accommodating a recording medium; a sensor unit for measuring, in chronological order, driving speed, three-dimensional angular velocity, and longitudinal/lateral acceleration of a vehicle; and a recorder unit for recording the measurement data obtained from the sensor unit and processed data thereof in the recording medium accommodated in said medium accommodating mechanism, wherein said recorder unit, upon recognizing that a behavior occurs when a variation range of said measurement data exceeds a predetermined threshold, records the measurement data at a time of behavior occurrence and for a predetermined time before and after that time of behavior occurrence; records, according to changes in the driving condition, time and location information at a time of such changes; updates an absolute maximum value when an absolute maximum value of new measurement data exceeds that of already recorded measurement data; and calculates an average value of said measurement data whenever a predetermined period has elapsed, and records it together with absolute maximum and absolute minimum values within said predetermined period.

Said recorder unit may be configured so that if said vehicle has stopped for more than a certain period of time, the measurement data during stopping is recorded at intervals that are several bit multiples of the measurement data during driving.

Said recording medium is a card-like recording medium that stores data for identifying a vehicle and its driver, and operation purpose information including information indicative of whether for business or private purposes and/or whether for toll-free road or toll highway, which is both read when reading the measurement data recorded, and may configured so that it prompts a predetermined data processing means for different styles of data processing according to said operation purpose information, regardless of the same behavior features for the same vehicle.

According to a second aspect of the present invention, there is provided an operation control assisting apparatus, which comprises: a data reading means for reading recorded data from a recording medium where measurement data indicative of features of behavior of a vehicle is recorded as linked to data indicative of occurrence date/time and occurrence place of the behavior; a criteria setting means for setting data criteria indicative of predetermined behavior features; and a data processing means for extracting said recorded data read by said data reading means that match said set data criteria, classifying them according to behavior features, and aggregating the classified data per a predetermined period, said data processing means also replacing said occurrence place data linked to the aggregated data with geographical name data, and outputting said aggregated data in a visually-recognizable manner for use in operation control of said vehicle and driver thereof.

Said criteria setting means may permit entering into an embedded area of a guidance displayed on a predetermined setup screen, criteria patterns for identifying behavior features of the vehicle, including dangerous behaviors. Said criteria setting means may also permit entering into an embedded area of a guidance displayed on a predetermined setup screen, criteria patterns for identifying driving habits.

Said data processing means may compare said recorded data to said data criteria indicative of features of driving interruptions, thereby identifying the time and place of occurrence of the driving interruptions and generating, in chronological order, geographical name data corresponding to the place of the driving interruptions identified.

According to a third aspect of the present invention, there is provided an operation control assisting apparatus comprising: a data reading means for reading measurement data from a recording medium where measurement data indicative of behavior features of a vehicle, including its driving speed, is recorded; and a data processing means for classifying said measurement data read by said data reading means into a plurality of driving speed ranges and detecting the behavior of said vehicle in each of the speed ranges according to the classified measurement data, said data processing means also generating judgment information for judging the driving tendency of a driver of the vehicle in an ex post facto way based on the results of the detection, so that the judgment information is outputted in a visually-recognizable manner and used for operation control of said vehicle and the driver thereof.

Said data processing means may perform at least one of correlation analysis and multivariate analysis between dissimilar measurement data, thereby generating said judgment information.

One of said measurement data to be processed may be kinetic acceleration data in a predetermined direction of said vehicle.

Said data processing means may also compare statistical values of the classified data about the recorded data for a plurality of drivers to similar data of a target driver to be analyzed, thereby generating said judgment information regarding said target driver.

Said data processing means may compare classified data about a specific reference driver exhibiting a specific driving tendency to similar data about a target driver to be analyzed, thereby generating said judgment information regarding said target driver. Said reference driver may then be a driver exhibiting relatively less data indicative of features of dangerous behavior.

Said data processing means may also include a fuel consumption tendency analysis module that creates data indicative of driving efficiency based on said judgment data for individual drivers and quantitatively identify fuel consumption tendencies of those drivers. Said fuel consumption tendency analysis module may then create data indicative of said efficiency by using, as variables, driving tendency elements of a driver including idling time of the vehicle and its driving speed and acceleration variability derived by analyzing said behavior features.

According to a fourth aspect of the present invention, there is provided an operation control system having a data recorder and an operation control assisting apparatus, wherein said data recorder comprises: a media accommodating mechanism for detachably accommodating a recording medium; a sensor unit for measuring, in chronological order, driving speed, three-dimensional angular velocity, and longitudinal/lateral acceleration of a vehicle; and a recorder unit for recording the measurement data obtained from the sensor unit and processed data thereof in the recording medium accommodated in said medium accommodating mechanism, wherein said recorder unit, upon recognizing that a behavior occurs when a variation range of said measurement data exceeds a predetermined threshold, records the measurement data at a time of behavior occurrence and for a predetermined time before and after that time of behavior occurrence; records, according to changes in the driving condition, time and location information at a time of such changes; updates an absolute maximum value when an absolute maximum value of new measurement data exceeds that of already recorded measurement data; and calculates an average value of said measurement data whenever a predetermined period has elapsed, and records it together with absolute maximum and minimum values within said predetermined period; and wherein said operation control assisting apparatus comprises: a data reading means for reading recorded data from a recording medium where measurement data indicative of features of behavior of a vehicle is recorded as linked to data indicative of occurrence date/time and occurrence place of the behavior; a criteria setting means for setting data criteria indicative of predetermined behavior features; a first data processing means for extracting said recorded data read by said data reading means that match said set data criteria, classifying them according to behavior features, and aggregating the classified data per a predetermined period, said first data processing means also replacing said occurrence place data linked to the aggregated data with geographical name data; and a second data processing means generating judgment information indicative of driving tendency of the driver based on the measurement data indicative of behavior features of the vehicle including its driving speed.

The operation control system may further comprises: an image data storage means for storing image data representing scenes around said vehicle; and an image processing means for reading, upon input of a time of occurrence of a desired behavior feature, said scene image data at said time of occurrence, thereby embodying the scene image.

It may also have an image processing means for visualizing a driving route of said vehicle by identifying at least driving interruption and an place of occurrence thereof from the measurement data recorded by said data recorder and comprehensively displaying on a predetermined map image a driving history including the place of driving interruption of the vehicle equipped with said data recorder.

According to a fifth aspect of the present invention, there is provided a computer-readable recording medium where digital information is stored for causing a computer unit to execute the steps of: reading recorded data from a recording medium where measurement data indicative of features of behavior of a vehicle is recorded as linked to data indicative of occurrence date/time and occurrence place of the behavior; setting data criteria indicative of predetermined behavior features; extracting said recorded data read that match said set data criteria and classifying them according to behavior features; aggregating the classified data per a predetermined period; replacing said occurrence place data lined to the aggregated data with geographical name data; and outputting the aggregated data in a visually-recognizable manner.

According to a sixth aspect of the present invention, there is provided a computer-readable recording media where digital information is stored for causing a computer unit to execute the steps of: reading recorded data from a recording medium where measurement data indicative of features of behavior of a vehicle including its driving speed is recorded; classifying said recorded data read according a plurality of driving speed ranges; detecting the behavior of said vehicle in each speed range based on the classified measurement data; creating judgment information for judging the driving tendency of a driver of said vehicle in an ex post facto way based on the results of the detection; and outputting the judgment information in a visually-recognizable manner.

BRIEF DESCRIPTION OF THE DRAWINGS

FIG. 4 is an explanatory view illustrating an overall image of data recorded in a memory card.

FIG. 5 is a view of control data structure.

FIG. 6A is a view of event data structure, where an event head placed at the beginning or boundary of an event is shown.

FIG. 6B is a view of event data structure, where an example of autonomous data (Ax, etc.) indicative of event content and vehicle speed data is shown.

FIG. 7 is a view of the event data indicating the speed, event occurrence place, and GPS time obtained from GPS data.

FIG. 8 is a view of status collection data structure.

FIG. 9 is a view of autonomous aggregation data and vehicle speed aggregate data structure.

FIG. 10 is a view of GPS aggregate data structure.

FIG. 12 is a view depicting an example of initial information setup screen.

FIG. 13 is a view depicting an example of driving habit (bad habit) criteria setup screen.

FIG. 14 is a view depicting an example of dangerous behavior criteria setup screen.

FIG. 23 is a view depicting one example of operation control daily report.

FIG. 24 is a view depicting one example of safe driving daily report.

FIG. 25 is a view depicting one example of dangerous behavior monthly report.

FIG. 27 is a view depicting a display example of dangerous behavior list.

PREFERRED EMBODIMENTS FOR IMPLEMENTING THE INVENTION

An embodiment of the present invention is described in detail hereinbelow.

Figure 1:
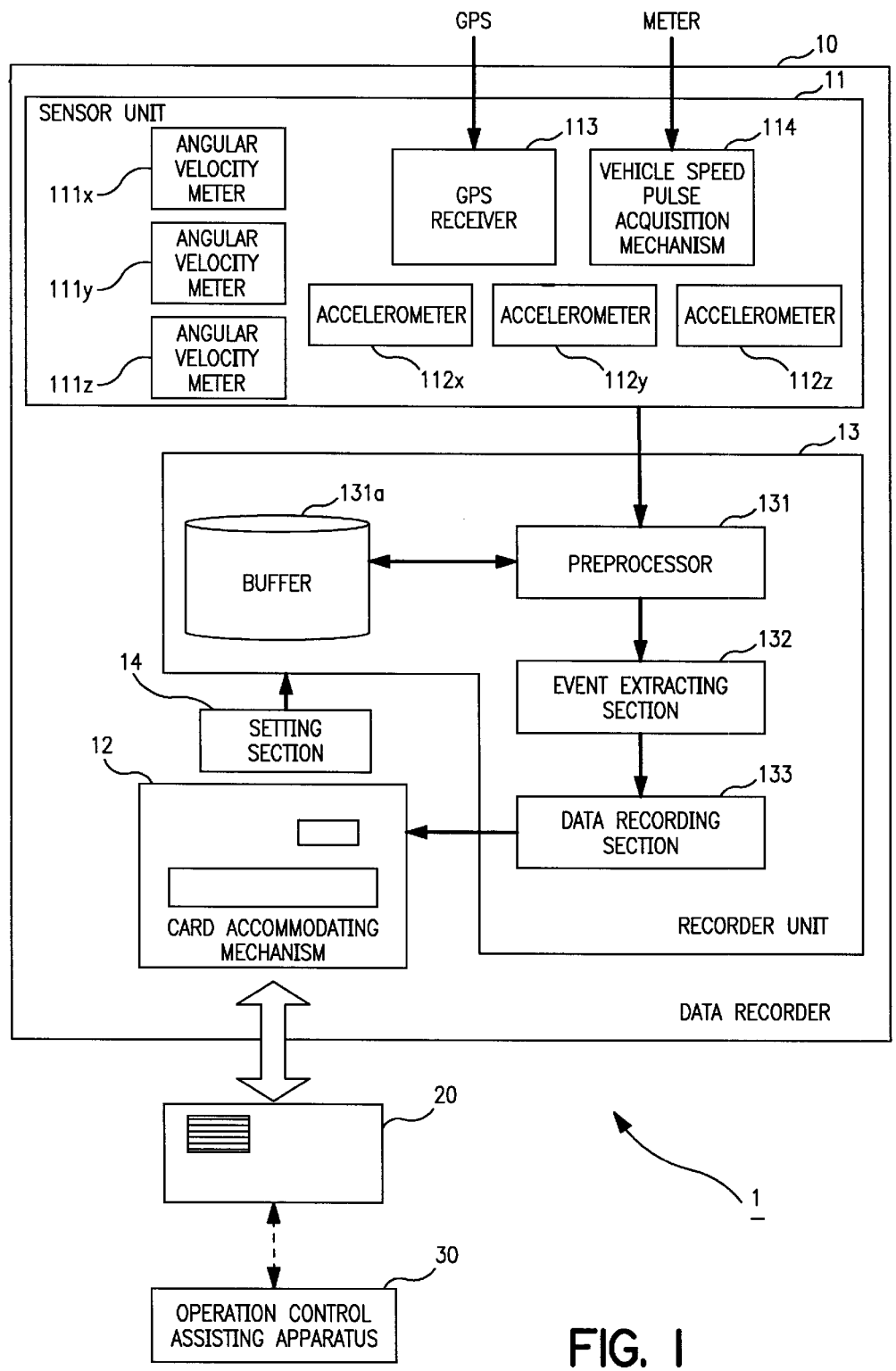
FIG. 1 is a schematic diagram of an operation control system that embodies the present invention.

FIG. 1 is a schematic diagram of an operation control system that embodies the present invention.

The operation control system 1 has a data recorder 10, a memory card 20, and an operation control assisting apparatus 30. The data recorder 10 is mounted onboard a target vehicle at any desired position. The memory card 20 is used to record, on a driver-by-driver basis, data representing behavior features of the vehicle and its driving condition. The operation control assisting apparatus 30 reads the data recorded in the memory card 20 and generates judgment information for judging driving tendency of the vehicle. Below are described specific examples of the respective units.

[Data Recorder 10]

The data recorder 10 includes a sensor unit 11, a card accommodating mechanism 12, a recorder unit 13, and a setting section 14. The sensor unit 11 has angular velocity meters 111$x$, 111$y$, and 111$z$, accelerometers 112$x$, 112$y$, and 112$z$, a GPS (Global Positioning System) receiver 113, and a pulse acquisition mechanism 114. The angular velocity meters 111x, 111y, and 111z measure angular velocity data (roll rate, pitch rate, and yaw rate) around the three-dimensional axes for the vehicle equipped with the data recorder 10. The accelerometers 112x, 112y, and 112z measure acceleration data in longitudinal, lateral, and vertical directions (acceleration, deceleration, cornering acceleration, vertical acceleration, etc.) of the vehicle. The GPS receiver 113 receives GPS data that represents the current latitude, longitude, speed, direction, time, etc. of the vehicle. The pulse acquisition mechanism 114 acquires vehicle speed pulses from vehicle meters, etc.

Of the data measured by the sensor unit 11, the angular velocity data, acceleration data, and vehicle speed data form a set of data representing behavior features that are important in evaluating the driving tendency of a driver. In the present embodiment, a case is described herein where acceleration data (longitudinal G) as denoted by "+○G" (where "○" and "G" stand for a numeral value and kinetic acceleration, respectively), deceleration data (longitudinal G) as denoted by "−○G", rightward acceleration data (lateral G) as denoted by "left turn +○G", leftward acceleration data (lateral G) as denoted by "right turn −○G", right-turn angular velocity data (yaw rate, etc.) as denoted by "+○°/sec", and left-turn angular velocity data (yaw rate, etc.) as denoted by "−○°/sec" are used. It should be appreciated that this is merely one example and is not intended to limit the scope of the invention.

The sensor unit 11 is configured so that the GPS data and vehicle speed pulse may be outputted switchably as appropriate. That is, for the velocity and driving distance, the vehicle speed pulse signal is used if it is acquired, whereas the GPS data would otherwise be used.

The card accommodating mechanism 12 detachably accommodates the memory card 20 to assist in reading and writing data to and from the recorder unit 13.

The recorder unit 13 includes a CPU (central processing unit) and a memory. The CPU reads and executes a predetermined program stored in a portion of the memory, thereby implementing the respective functions of a preprocessor 131, an event extracting section 132, and a data recording section 133.

The preprocessor 131 temporarily stores measurement data outputted from the sensor unit in a buffer 131a, and removes offset and drift components contained in the angular velocity data among the set of data stored. The preprocessor 131 also performs matching between the autonomous data (also called "inertia data") consisting of angular velocity data and acceleration data and the GPS data. That is, because the GPS data has a delay of about 2 seconds relative to the autonomous data, it is matched to the autonomous data 2 seconds earlier. This allows for improvement in accuracy of subsequent analysis.

From the stored data where offset components, etc. have been removed by the preprocessor 131, the event extracting section 132 extracts, per a predefined aggregation time, a set of data (angular velocity data, acceleration data, GPS data, vehicle speed data, etc: hereinafter referred to as "event data") that represents behaviors exceeding predetermined thresholds that have been set so as to remove noise levels and stop behaviors that are not equivalent to halts (such conditions are referred to hereinafter as "events"). Furthermore, the event extracting section 132 sends the extracted event data, event occurrence date/time (GPS time), event occurrence place, count of each event (according to its setting), driving distance after event occurrence, and initial information (recorder number, driver name, vehicle number, etc), and so forth to the data recording section 133. The driving distance after event occurrence represents a distance traveled after braking is applied, which is determined by counting a predetermined number of vehicle speed pulses with a scale factor after one vehicle speed pulse occurs. If the vehicle speed pulses cannot be acquired, the velocity may be detected by changes in GPS latitude and longitude, which may be integrated to determine the distance.

The measurement date/time (GPS time) is the date/time obtained by adding 9 hours to GMT (Greenwich Mean Time) received by the GPS receiver 112. The event occurrence place represents the location information that may be identified by the GPS latitude and longitude.

The data recording section 133 classifies the data processed by the preprocessor 131 and event extracting section 132 into control data, status collection data, event data, and aggregate data (file) and stores the classified data in the memory card 20. The data recording section 133 also records vehicle ignition ON/OFF, data recorder power ON/OFF, and driving/stopping, as well as occurrence time and description (when, where, and what happens) when a GPS communication normal/abnormal event occurs, by way of predefined bit patterns.

The memory card 20 is a portable IC (integrated circuit) chip card having a nonvolatile memory, or EEPROM (Electrically Erasable and Programmable Read-Only Memory), ROM (Read-Only Memory), and CPU. The ROM stores program codes, which, when read and executed by the CPU of the IC chip, implements memory control functions, whereas the EEPROM stores the aforementioned control data, status collection data, event data, and aggregate data, as appropriate. It should be appreciated that if the memory control function is implemented by the data recorder 10 and operation control assisting apparatus 30, it is not necessary for the memory card 20 to provide memory control functions (CPU and ROM) at all times.

The setting section 14 is intended to set the data to distinguish whether the driving is for business or private purposes, or whether it is for toll-free road or toll highway. This data indicative of the driving purpose may be provided as functionality of the operation control assisting apparatus 30 described later.

Figure 2:
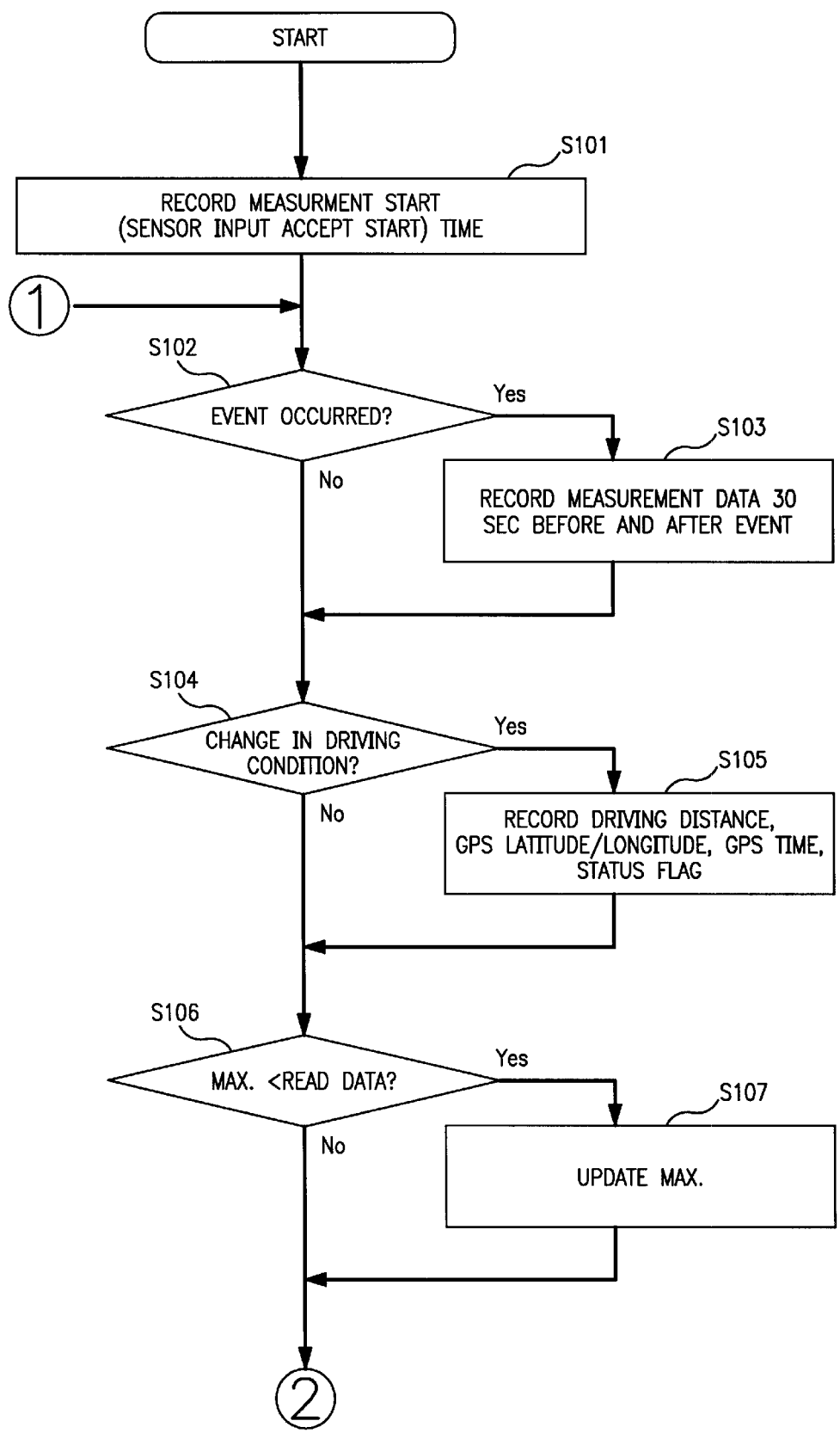
FIG. 2 is a flow chart (1/2) for recording data according to an embodiment of the present invention.
Figure 3:
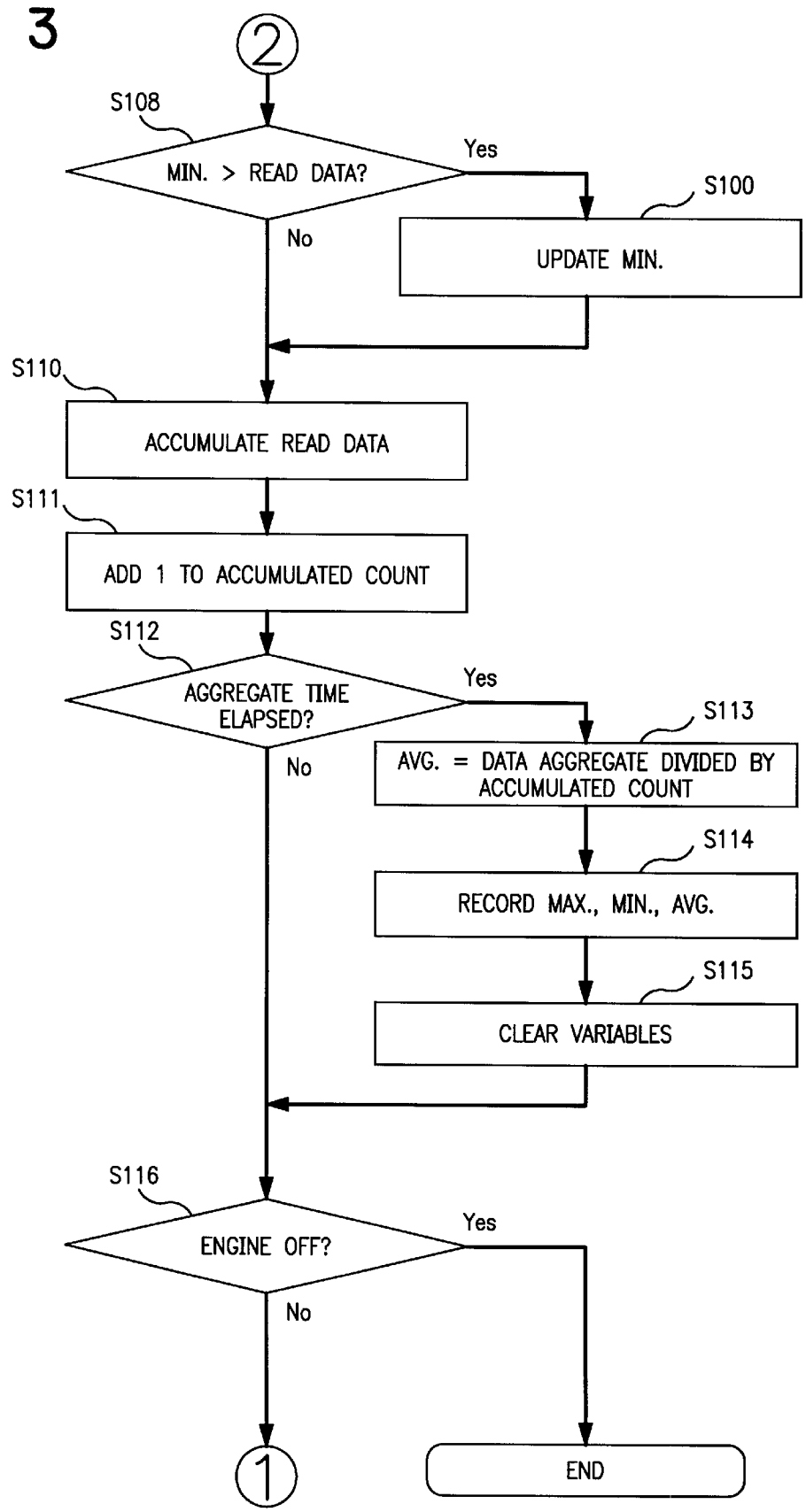
FIG. 3 is a flow chart (2/2) for recording data according to an embodiment of the present invention.
Figure 11:
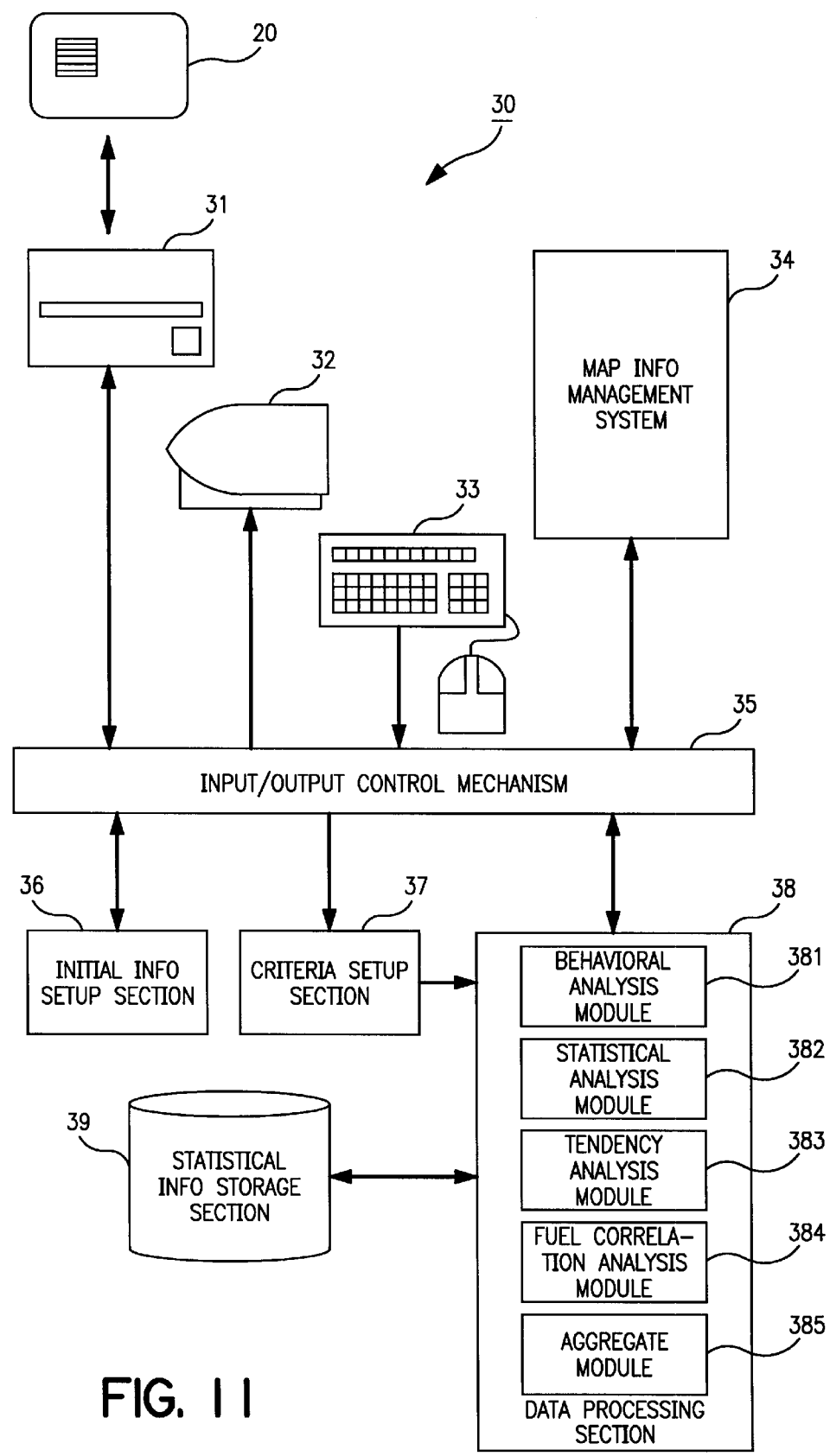
FIG. 11 is a block diagram of an operation control assisting apparatus.

Next, the procedures for recording the data that represents behavior features and driving condition of the vehicle into the memory card 20 at the data recorder 10 are described with reference to FIGS. 2 and 3. FIGS. 2 and 3 are flow charts for the procedures at the recorder unit 13. It is presumed here that the memory card 20 has stored as a portion of the control data the data for identifying the vehicle and its driver, and that the data for identifying the driving purpose has been set as a portion of the control data by the setting section 14, etc.

When the vehicle starts to move by initiating the driving, various measurement data indicative of vehicle behavior features as measured by the sensor unit 11 is sequentially stored in the buffer 131a. As shown in FIG. 2, the recorder unit 13 determines the time of measurement start based on the GPS data (GPS time), and stores it as a portion of the control data into the memory card 20 (step S101). When an event occurs, that is, when the measurement data exceeding the threshold is detected, the measurement data for a predetermined period, for example, before and after 30 seconds, after that event is extracted by scanning the buffer 131a, and is stored as event data into the memory card 20 (steps 102: Yes and S103).

The threshold should not be fixed but have a variation range in order to support meter offsets and places like slopes.

For example, it is determined whether an event has occurred by checking whether either of a difference between the output of angular velocity meter 111x, 111y, 111z and the average of the past three seconds, or a difference between the output of the accelerometer 112x, 112y, 112z and the average of the past three seconds exceeds a preset variation range. The meter output and average may be determined by vector composition (Pythagorean theorem) of the three meter outputs.

If a new event occurs during event processing, it is ignored; if a new event occurs within 30 seconds after event processing, data is recorded for 60 seconds after completion of its preceding event.

Whenever there is any change in driving condition regardless of whether an event has occurred or not, the driving distance, GPS latitude/longitude, and GPS time are read from the buffer 131, and recorded together with status flags described hereinbelow (ignition ON/OFF, drive/stop, etc.) into the memory card 20 as status collection data (steps S104: Yes and S105). If the read data exceeds the maximum value of the measurement data of the relevant type, that is, its positive absolute maximum value, the maximum value is updated so that the read data is a new maximum value (steps S106: Yes and S107). As shown in FIG. 3, if the read data is less than the current minimum value, that is, the negative absolute maximum value, the minimum value is updated so that the read data is a new minimum value (steps S108: Yes and S109). The read data is accumulated to determine an average, while "1" is added to the accumulated count (steps S110 and S111).

The above steps are repeated until a preset aggregate time has elapsed (steps S112: No and S116: No), and when the aggregate time is reached, the read data accumulated is divided by the accumulated count to determine an average of the measurement data (step S113). The maximum, minimum, and average values of the measurement data are stored into the memory card as aggregate data, and after recording, each variable is cleared (steps S114 and S115).

When the engine is turned OFF, the power supply to the data recorder 10 is maintained (by the capacitor, for example) until the last aggregate time has elapsed, upon which the data recording process ends.

By employing the recording procedures as described above, the driving tendency can be represented more clearly, and the data capacity of the memory card 20 can also be saved.

It is presumed in the above explanation that the vehicle is under driving conditions including temporary stops (halts). If it is obvious that the vehicle stops completely, that is, if the engine is not turned OFF but fluctuations in the measurement data continue for a certain period of time, data recording is performed by decimating the time. For example, if the above aggregate time is 1 minute, then the above status flag is recorded as "stop" about once every 256 minutes. Whether or not the vehicle stops completely is checked by determining whether all the measurement data, including the driving distance measured in terms of GPS data and the measurement data of the sensor unit 11 do not exceed the threshold. This permits the data capacity to be saved more significantly, while detecting the stop condition of the vehicle.

FIGS. 4–10 show an image of data recorded in the memory card 10 according to the above procedures. FIG. 4 is a view depicting an overall image, where the aggregate data, event data, and status collection data are recorded in arbitrary areas in chronological order in which data occurred. It should be noted that "ID" denotes identification data for a data field, where several most-significant bits are used to indicate the block structure of that field.

FIG. 5 is a view of a control data structure. "30h" to "33h" denote ID, and "Lot No." is identification data for the production lot. "Ax sf", "Ay sf", and "Az sf" stand for scale factors of acceleration data in the X, Y, and Z axes, respectively; "p sf", "q sf", and "r sf" represent scale factors for the pitch rate, yaw rate, and roll rate, respectively. The scale factor, which relates to accuracy of measurement, is one of the criteria that are set as initial information as described later. "Vehicle speed", which is speed data determined by the vehicle speed pulses, is given priority over the speed data based on the GPS data. "Serial No." is a unique number of that production lot.

FIGS. 6 and 7 show an event data structure. The event data is recorded from the preceding event recording time to the subsequent event recording time in pair, as centered around the event occurrence time, as shown in FIG. 4. FIG. 6A depicts an event head that is placed at the beginning or boundary of the event, while FIG. 6B depicts autonomous data (Ax, etc.) and vehicle speed data that represent the event content.

FIG. 7 shows the speed, event occurrence place, and GPS time obtained form the GPS data. "sts" denotes a distinction between no location positioning, two-dimensional location positioning, three-dimensional location positioning, and differential location positioning. It should be appreciated that the GPS data occurs in the event data upon every GPS reception.

FIG. 8 is a view of a status collection data structure. This data is recorded in the structure shown at regular intervals (e.g., 1 second) whenever the driving condition changes. "Status" in the lower portion thereof is a status flag represented by the afore-described bit pattern. For example, first, second, and third bits are assigned to ignition (logic one: ON, logic zero: OFF), power supply voltage (logic one: abnormal, logic 0: normal), and vehicle condition (logic one: driving, logic zero: stopping), respectively.

It should be appreciated that the number of bits and their corresponding status representations may be arbitrarily added or modified as needed.

FIGS. 9 and 10 are views of aggregate data structures. FIG. 9 shows autonomous and vehicle speed aggregate data, while FIG. 10 shows GPS aggregate data. In FIG. 10, "sts" indicates whether or not GPS data has been collected without any loss during the aggregate interval. For "Latitude" and "Longitude", the position locating data nearest to the center (average) is recorded. In its simplest form of processing, if the aggregate period is 1 minute, for example, then data at a portion of 30 in current seconds is adopted. It should be appreciated that if the aggregate period is less than 1 minute, no recording is done on the assumption that there is no location positioning data.

The above event data, aggregate data, and status collection data that are recorded randomly may be identified by the ID. For example, if the ID is "00h", "03h", "10h", or "11h", it is identified as event data, whereas if the ID is "02h", "20h", "21h", or "22h", it is identified as aggregate data.

[Operation Control Assisting Apparatus 30]

Next, the operation control assisting apparatus 30 is described.

The operation control assisting apparatus 30 has a CPU, various RAMs (Random Access Memory), a ROM, and an external storage device, and is implemented by a computer unit operating under control programs, such as BIOS (Basic Input/Output System) and operating system (OS). This computer unit has a card reader/writer 31, a display device 32, a data input device 33, a map information management system 34, and an input/output control mechanism 35. The card reader/writer 31 is designed to accommodate the memory card 20 to record data therein, and read and write data to and from it. The display device 32 displays input screens for various setup information, and data and information for verifying the analysis results. The data input device 33 is used to enter data and commands, etc. The map information management system 34 is well known. The input/output control mechanism 35 controls inputs and outputs between those devices and internal functions. The map information management system 34 contains a database management mechanism that is responsive to at least an input of location information to retrieve geographical name data (district names, etc.) and geographical images corresponding to that location information.

The functions of an initial information setup section 36, a criteria setup section 37, a data processing section 38, and a statistical information storage section 39 of the operation control assisting apparatus 30 are formed by causing the CPU to read digital information (program code and necessary data) stored in a predetermined recording medium and cooperatively execute it with a control program. In the data processing section 38 are formed a plurality of functional modules, such as, for example, a behavioral analysis module 381, a statistical analysis module 382, a tendency analysis module 383, a fuel correlation analysis module 384, and an aggregate module 385.

When the memory card is initially used, the initial information setup module 36 sets up personal information, information about the data recorder 10, and information about the vehicle having the data recorder mounted onboard into the memory card 20 via the input/output control mechanism 35. The personal information contains the name of the driver who owns the memory card 20, the name of the company he/she belongs to, his/her title, and so forth; the information about the data recorder 10 contains the recorder number that identifies the data recorder, the lot number of the data recorder 10, and so forth. The information about the vehicle contains the vehicle number for the vehicle having the data recorder 10 mounted onboard, vehicle type, vehicle speed pulse, angular velocity data, scale factor for the vehicle speed pulse, and so forth.

On the initial information setup section 36, a setup interface screen for providing predetermined embedded dialog windows is displayed for guidance on the display device 32. This permits the driver or control service personnel to enter relevant data into the embedded areas of these dialog windows via the data input device 33 so that various initial information can be set up. FIG. 12 shows a setup screen and its contents by way of example. The initial information that has been set is used as a portion of the control data described previously.

The criteria setup section 37 sets up data criteria (various criteria patterns) for recognizing the contents of individual events of the vehicle at the data processing section 38. The data criteria include a criteria pattern for determining whether an event is a dangerous behavior that may be directly associated with an accident (a single threshold at a data level, or a combination of thresholds); a criteria pattern for identifying a safe behavior that is not associated with a dangerous behavior (whether there is an amount of data variation within a certain period of time); a criteria pattern for determining a bad habit of the driver (same as the dangerous behavior); a criteria pattern for recognizing a halt or drive interruption (stop duration); and other criteria patterns. Each of these criteria patterns may be arbitrarily set up by a human analyzer who utilize this system.

On this criteria setup section 37, a setup interface screen for providing predetermined embedded dialog windows is also displayed for guidance on the display device 32. As the human analyzer enters relevant data into the embedded areas of these dialog windows via the data input device 33, criteria patterns may be set up.

For example, FIG. 13 shows bad habit thresholds for determining a bad habit portion of the driving habits, while FIG. 14 depicts a dangerous behavior threshold setup screen for determining a dangerous behavior. It should be appreciated that FIGS. 13 and 14 are merely shown by way of example, and the setup contents as shown are not limiting.

The data processing section 38 cooperates with each of the functional modules 381–385 to perform required data processing on the recorded data of the memory card 20 acquired via the input/output control mechanism 35. The data processing section 38 allows the processing results to be displayed on the display device 32, superimposed over the map image of the map information management system 34, or stored in an external storage device (not shown). The data processing section 38 also recognizes the vehicle name, driver name, driving purpose, and scale factor of data from the control data contained in the recorded data of the memory card 20. Each of the functional modules 381–385 in the data processing section 38 is as described below, and is configured so that it may be selectively activated.

The behavioral analysis module 381 extracts the event data, aggregate data, and status collection data that match preset criteria patterns to identify behavior features of the vehicle from the start to the end of the operation. Along with that, the behavioral analysis module 381 identifies the operation start place (park out place) and its time; the behavior occurrence place and its time or duration; and the operation end place (park in place) and its time. It identifies and records behavior features corresponding to dangerous behaviors or bad habits, without fail. It also identifies the driving direction (forward/backward), driving speed, facts of acceleration occurrences during driving, driving distance, facts of halt occurrences, idling time, drive interruption places, presence or absence of power supply failure, and so forth. Furthermore, it searches and retrieves from the map information management system the geographical name data corresponding to each place, and replace a portion related to the relevant place with the map data retrieved.

It should be appreciated that by recognizing the driving purpose information described above, the criteria patterns may be modified according to the driving purpose information, even for the same event associated with the same vehicle. For example, a speed of 80 km per hour means a high-speed driving on a typical toll-free road, but is judged as normal driving on a toll highway. It may also possible to change the data reading intervals so that they are shorter for highway driving than for toll-free road driving. Similarly, drive interruption places, for example, may not be recorded for private purposes.

By performing behavioral analysis as described above, the presence or absence of dangerous behavior or bad habit, its occurrence frequency, and driving history based on the criteria set by the human analyzer can be determined quantitatively, thereby facilitating the creation of an aggregate list as described below. Especially, because the behavior occurrence place is represented by geographical name data, it would be easier to understand than if it is represented by numerical data, while the time is calculated based on the GPS data, so that accurate data will result. Each set of data identified by the behavioral analysis module 381 is stored in the statistical information storage section 38 on a driver-by-driver basis.

The statistical analysis module 382 performs statistical analysis on driver-specific data and creates judgment information for judging the driving tendency based on statistics. The statistical analysis module 382 averages all the driver-specific data stored in the statistical information storage section 39 according to their type, and determines relative values for the driver-specific data relative to the average value. In this case, the "type" means, for example, the behavior occurrence frequency, driving speed, constant-speed driving time, idling time, and so forth, by which the features of the individual's driving tendency relative to the whole can be statistically ascertained. Additionally, the module may be set so that the event data, status collection data, and aggregate data for each driver are stored, and the value of longitudinal G or lateral G relative to the driving speed or angular speed by the whole drivers is merged in the same data field. The statistical analysis module 382 may determine variance thereof and a curve that represents variance characteristics, so that a deviation of the individual's curve relative to the resulting curve may be determined.

Considering that there are few people who are willing to drive dangerously, analytical procedures may be performed such that a data area of a driver who exhibited few dangerous behavior in statistical terms may be defined as a safe driving area, and it is decided, by checking if any deviation form this data area is found, whether a driver is one who exhibits dangerous driving tendency or not.

The tendency analysis module 383 mainly uses the aggregate data to generate judgment information for judging the driving tendency of an individual driver, or a difference in driving tendency of another driver relative to that of a specific driver. As described above, the behavioral analysis module 381 permits the driving tendency to be objectively understood from the history of behaviors during driving, while the statistical analysis module 382 allows a difference in the driving tendency of the individual driver to be ascertained with reference to the whole. However, the behavioral analysis module 381 and so forth does not take into account a correlation between driving speed and kinetic acceleration (longitudinal G, lateral G, forward G, etc.); a correlation between angular velocity and kinetic acceleration; fluctuations in acceleration during driving; handling operation; and so on. For example, if the driver steps on the accelerator during driving, it is experimentally found that it would be more dangerous during driving at high speed than at low speed. This holds true for handling operation. If the driver is driving under fatigued condition, he or she tends to drive differently than under healthy condition. These operations appear as smaller or larger magnitudes of variation in longitudinal G, lateral G, and azimuth angular velocity, even at the same average speed. That is, by performing correlation analysis between dissimilar sets of data, such as speed data and acceleration data, it is expected to be easier to evaluate the driving tendency and determine a correlation between traffic accidents and degrees of fatigue.

Accordingly, the tendency analysis module 383 gives consideration to cross-correlation between the aggregate data (speed data, longitudinal G, lateral G, azimuth angular speed data, etc.), thereby generating judgment information for judging the correlation between the driving tendency and the traffic accidents and driver's fatigue, etc.

Although various types of judgment information may be conceivable, an example is shown here where the average per speed range and standard deviation are used to understand whether the driver has a safe driving tendency or dangerous driving tendency.

Figure 15:
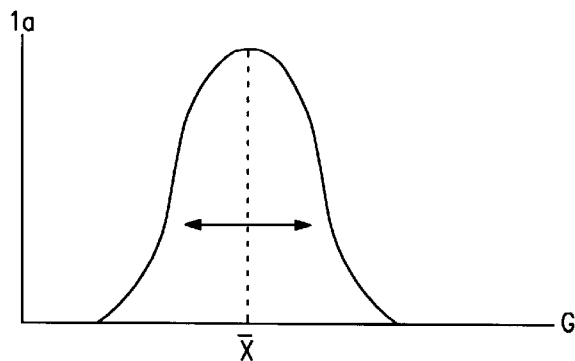
FIG. 15 is a graph plotting an average of acceleration, G, by a driver who drives in a typical manner and its fluctuations.
Figure 16:
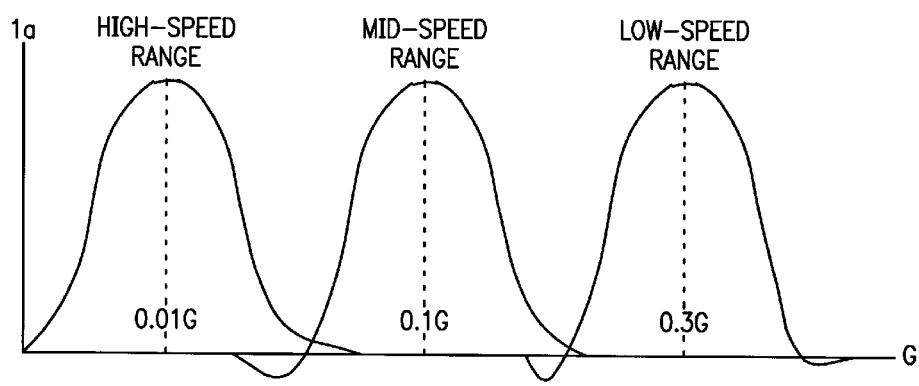
FIG. 16 is a graph plotting fluctuations in acceleration according to speed range.

Average and standard deviation may be grasped, for example, as a distribution of fluctuations in acceleration relative to average speed. FIG. 15 is a graph plotting the average (bar X) by a driver who drives in a standard manner and its fluctuations, where the horizontal axis denotes acceleration (G) and the vertical axis denotes frequency of acceleration (1$a$). FIG. 16 is a graph plotting fluctuations in acceleration by that driver according to speed range, where it is assumed that "low-speed range" is a speed range of less than 30 km/h; "mid-speed range" is a speed range of less than 70 km/h; and "high-speed range" is a speed range of 70 km/h or higher. It can be seen from FIG. 16 that accelerating or handling operation that causes an acceleration of about 0.1 G is safe in the low-speed range, but very dangerous in the high-speed range.

More simply, whether a driver has a safe driving tendency or not may be judged by checking how small the average and standard deviation of the individual driver are, or to what degree the profile of the target deviates from the profiles of multiple drivers. In the latter case, it may be judged that a driver with a smaller deviation has a safe driving tendency. However, such an approach alone does not always provide sufficient judgment accuracy. In order to enhance the accuracy, it is rational to make comparisons based on the profiles of drivers who actually drove safely.

Thus, in the present embodiment, a profile is determined based on the aggregate data of the drivers who exhibited relatively few dangerous behaviors, more preferably, no dangerous behaviors, and is used as a safe driving pattern. Then, by comparing the safe driving pattern to the profile of the target driver, information representing the degree of safe driving tendency exhibited by that target driver is created.

Figure 17:
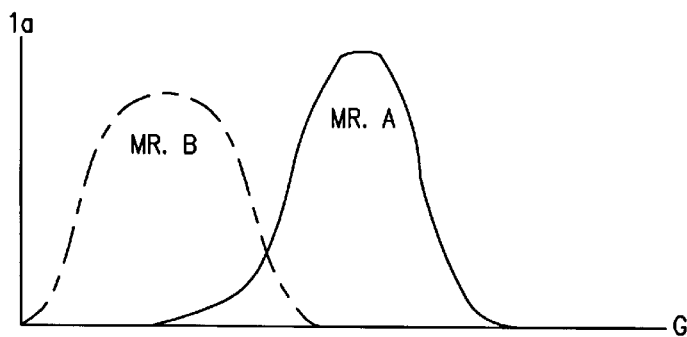
FIG. 17 is a graph showing a difference in profile of Mr. A who is a target driver to be analyzed as compared to the safe driving pattern of Mr. B who has a tendency for safe driving in a certain speed range.

For example, FIG. 17 shows a difference in profile of Mr. A who is a target driver as compared to the safe driving pattern of Mr. B who has a safe driving tendency in a certain speed range. In the example shown, because the profile of Mr. A is significantly shifted from the safe driving pattern, it may be unlikely to be a safe driving pattern.

A standard deviation for the whole of multiple drivers or for an individual driver may be determined as follows.

Figure 18:
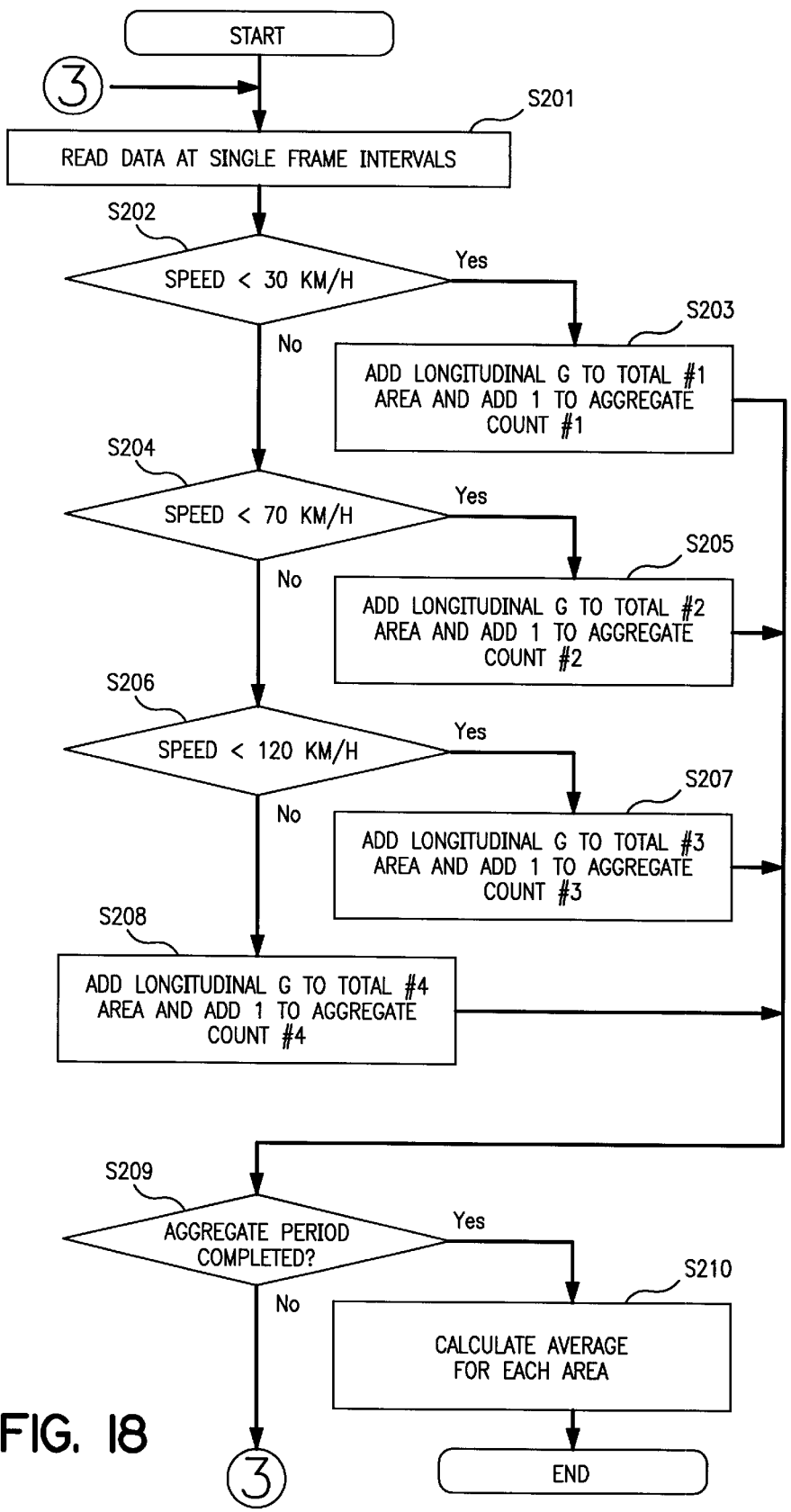
FIG. 18 is a flow chart (1/2) for explaining the procedures for calculating standard deviation.

First, according to the procedures shown in FIG. 18, average speeds are determined in the low-speed range (speed range of less than 30 km/h), mid-speed range (speed range of less than 70 km/h), and high-speed range #1 (speed range from 70 km/h or higher and less than 120 km/h), and high-speed range #2 (speed range of 120 km/h or higher). More specifically, speed data and longitudinal G are read at single frame intervals (step S201). If the speed is less than 30 km/h, the longitudinal G is added to "total #1" of a working memory (not shown), and 1 is added to "addition count #1" (steps S202: Yes and S203). If the speed exceeds 30 km/h and is less than 70 km/h, the longitudinal G is added to "total #2" area of the working memory, and 1 is added to "addition count #2" (steps S204: Yes and S205). If the speed exceeds 70 km/h and is less than 120 km/h, the longitudinal G is added to "total #3" of the working memory, and 1 is added to "addition count #3" (steps S206: Yes and S207). If the speed is 120 km/h or higher, the longitudinal G is added to "total #4" area of the working memory, and 1 is added to "addition count #4" (step S208). If the aggregate period is not exceeded, the routine returns to step S201 (step S209: No); if the aggregate period has expired, the averages for the respective areas "total #1" through "total #4" (accumulated value of longitudinal G/addition count: first average through fourth average) are calculated (step S210).

Figure 19:
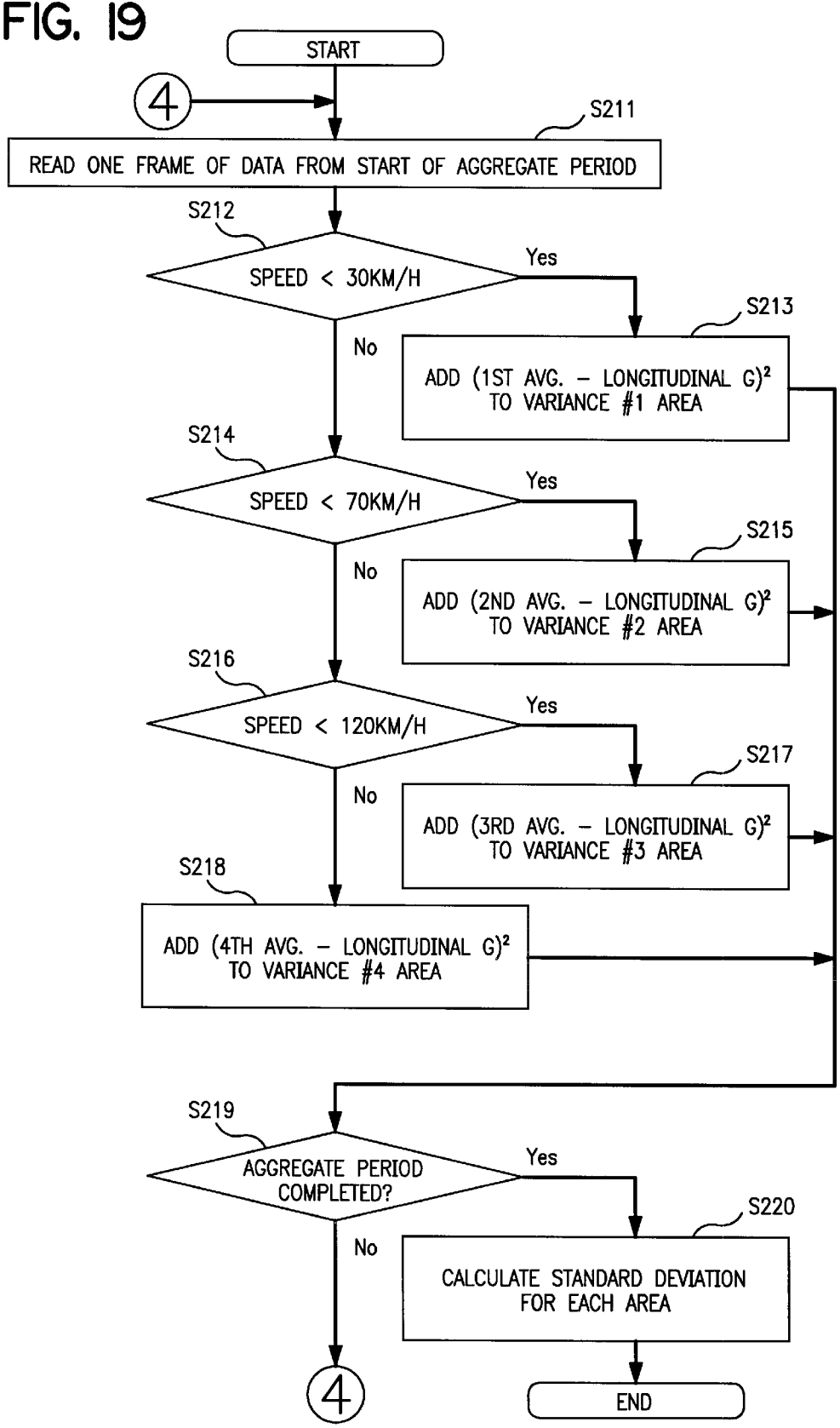
FIG. 19 is a flow chart (2/2) for explaining the procedures for calculating standard deviation.

After each average is calculated, a standard deviation is determined in accordance with the procedures shown in FIG. 19.

More specifically, the longitudinal G of the driver according to speed range is read at single frame intervals, from the beginning of the aggregate period (step S211). If the speed is less than 30 km/h, (first average—longitudinal G) raised to the second power is added to "variance #1" area of the working memory (steps S212: Yes and S213). If the speed exceeds 30 km/h and is less than 70 km/h, (second average—longitudinal G) raised to the second power is added to "variance #2" area of the working memory (steps S214: Yes and S215). If the speed exceeds 70 km/h and is less than 120 km/h, (third variance—longitudinal G) raised to the second power is added to "variance #3" area of the working memory (steps S216: Yes and S217). If the speed is 120 km/h or higher, (fourth average—longitudinal G) raised to the second power is added to "variance #4" area of the working memory (step S218). If the aggregate period is not exceeded, the routine returns to step S211 (step S219: No); if the aggregate period has expired, standard deviations in the respective areas of "variance #1" through "variance #4" are calculated (step S220). Each standard deviation may be computed by determining a square root of the sum in each variance area divided by the addition count.

It should be appreciated that the procedures in FIGS. 18 and 19 merely represent calculation procedures based on the speed data and longitudinal G, by way of example, to clarify the concept of standard deviation, and are not intended to restrict the meaning of standard deviation.

If the entire company or entire business office is used as a basis for comparison, the following procedures may be used, for example, to create judgment information.

First, the average of longitudinal G for each speed range of the whole is determined in accordance with the above procedures, and is used as "X". The standard deviation of longitudinal G for each speed range of the whole is then determined similarly, and is used as "S". Furthermore, the average of longitudinal G for each speed range of the individual driver is similarly determined, and is used as "M". Then, a deviation of the individual driver relative to the whole may be calculated according to the formula, "(X−M)/S". It can be judged that the smaller this deviation, the safer driving tendency the driver exhibits.

Figure 20:
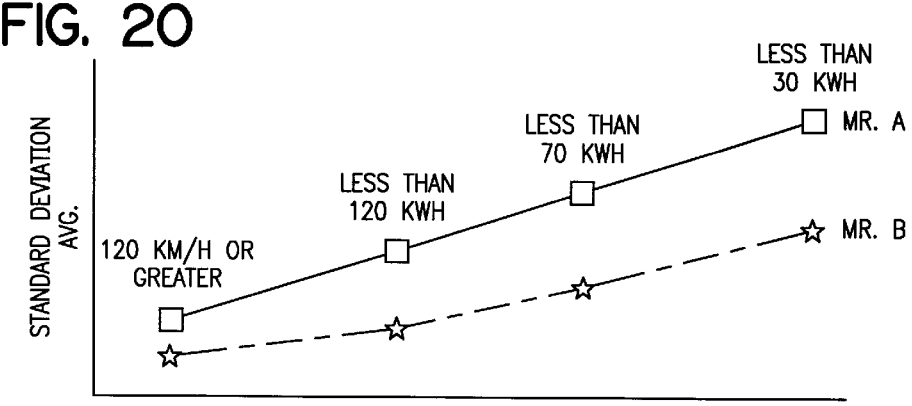
FIG. 20 is a graph showing a relationship between average and standard deviation according to speed range calculated for Mr. A and Mr. B.
Figure 21:
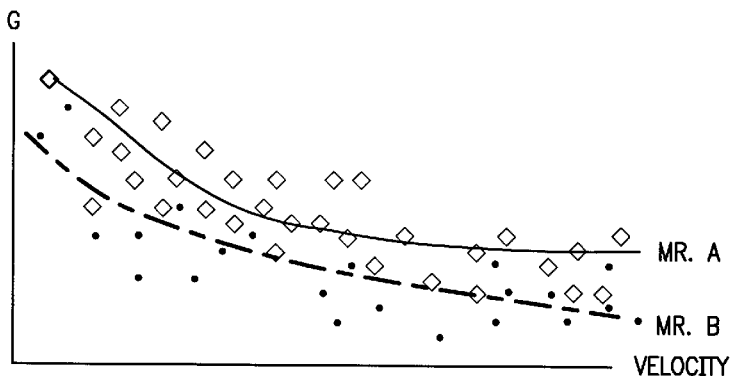
FIG. 21 is a graph illustrating a difference in speed vs. longitudinal G.
Figure 22A:
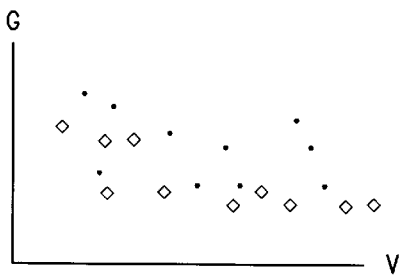
FIG. 22A is a correlation diagram of speed vs. forward G.
Figure 22B:
FIG. 22B is a correlation diagram of average speed vs. aggregated acceleration.
Figure 22C:
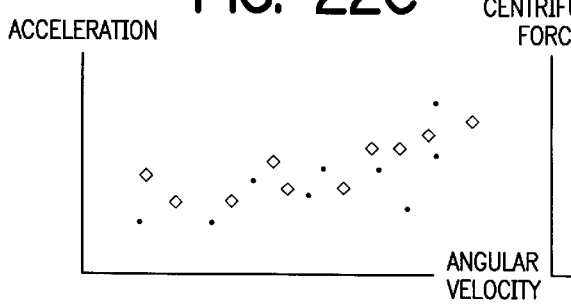
FIG. 22C is a correlation diagram of angular velocity vs. acceleration.
Figure 22D:
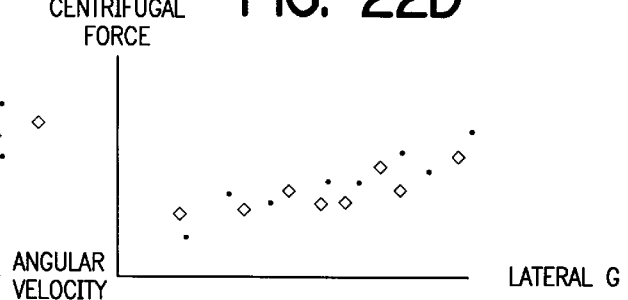
FIG. 22D is a correlation diagram of centrifugal force vs. lateral G.

FIG. 20 is a graph showing an example of average and standard deviation according to speed range as calculated for Mr. A and Mr. B mentioned above, which corresponds to the profile difference shown in FIG. 17. FIG. 21 is a graph illustrating a difference in speed vs. longitudinal G, as measured for Mr. A and Mr. B. As shown in these figures, because Mr. B has a safe driving tendency, his average and standard deviation are smaller than those of Mr. A, and his longitudinal G relative to speed is also smaller.

FIGS. 22A–22D are graphs illustrating the respective driving tendencies of Mr. A and Mr. B in terms of correlation of two different measurement items. FIG. 22A, FIG. 22B, FIG. 22C, and FIG. 22D show a correlation of speed vs. forward G, a correlation of average speed vs. cumulative G, a correlation of angular velocity vs. acceleration, and a correlation of centrifugal force vs. lateral G, respectively.

The fuel correlation analysis module 384 analyzes and quantifies the fuel consumption tendency of a vehicle on a driver-by-driver basis and generates judgment information for distinguishing between an efficient driving and inefficient driving. This quantification process may be performed by calculating the amount of fuel consumption, using, for example, the idling time of the vehicle identified by the behavioral analysis module 381, the driving speed, and the acceleration cumulative value based on the aggregate data, as variables.

Assuming, for example, that the idling time is "I", the acceleration cumulative value is "Gd", and other factor, such as average driving speed or driving time, is a constant "$\alpha$", then the amount of fuel consumption may be approximately represented by a result of computation, aI+bGd+$\alpha$. That is, as far as the number of starts is limited and the constant-speed driving time continues, the acceleration cumulative value Gd approaches "0"; thus, the fuel consumption is a function of the temporal factor, such as idling time I and driving time, and the speed factor, such as average driving speed. Coefficients "a" and "b" may be determined as follows.

(Coefficient "a")

For "Gd=0, $\alpha$=0", the amount of fuel consumption is a result of computation, i.e., coefficient "a" multiplied by idling time I. Thus, while the idling state is maintained for a certain time, the resulting amount of fuel consumption is actually measured. Substituting this result into the above formula yields coefficient "a".

(Coefficient "b")

With the idling time I equal to 0, driving is performed at the same average speed. Assuming that the amount of fuel consumption and acceleration cumulative value for the n-th driving is "amount of fuel consumption n" and "acceleration cumulative value Gdn", respectively, then the amount of fuel consumption n is represented by "b·Gdn+$\alpha$".

Because $\alpha$ is common due to the same average speed, coefficient b may be determined by dividing the difference in fuel consumption n for each time by the difference in acceleration cumulative value Gdn.

(Evaluation)

According to the above procedure, a, b, and constant $\alpha$ are confirmed, and the idling time I and acceleration cumulative value Gd are determined based on the status collection data, etc. to obtain the result of computation, "aI+bGd+$\alpha$". If the computation result is relatively small, it may be evaluated as "efficient driving", whereas if it is large, it may be evaluated as "inefficient driving". By collectively displaying the evaluation results for a plurality of drivers in the same data field, for example, the fuel consumption tendency of each driver may be recognized at a glance.

The aggregate module 385 aggregates data at predetermined intervals, for example, every business day or monthly, and perform statistical processing on the resulting data, thereby automatically creating reports where the data, such as the driving history of the vehicle, occurrence date/time of dangerous behavior, occurrence place, and occurrence frequency, is visually formatted by use of a graph, histogram, or list, for example. This report is also used for judging the driving tendency and thus makes a significant contribution to reducing the burden associated with daily operation control tasks.

The report created is displayed on the display device 32, and outputted, as needed, to a printer (not shown) for hardcopy printout. A daily report is one aggregated every business day, which is categorized as an operation control daily report and a safe driving daily report according to the purpose of aggregation. A monthly report is one aggregated per month, where facts of dangerous behaviors that occurred during one month and their times, for example, are recorded in chronological order. FIGS. 23 and 24 show examples of the operation control daily report and safe driving daily report, and FIG. 25 shows an example of the dangerous behavior monthly report.

Figure 26:
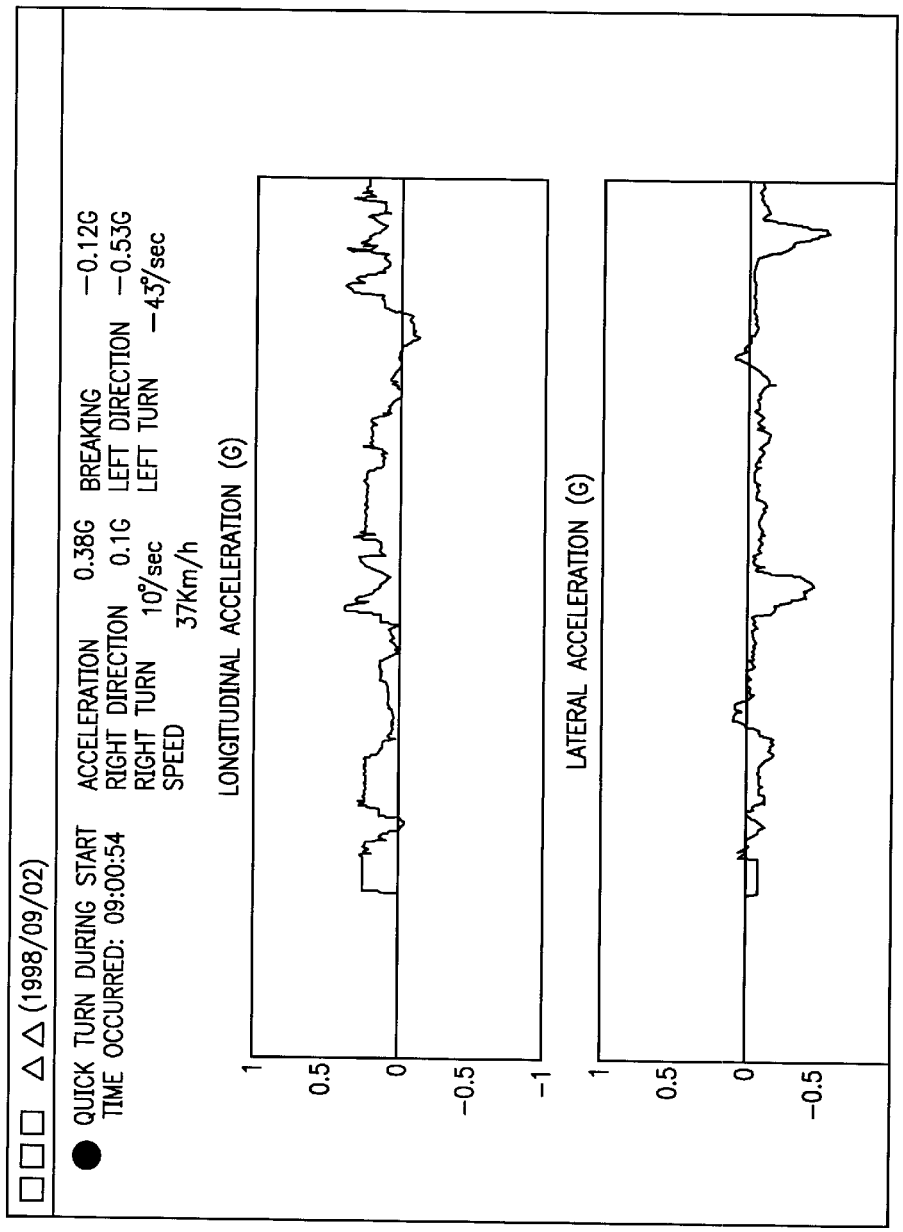
FIG. 26 is a view depicting a display example of dangerous behavior detail graph.

The aggregate module 385 also has the capability of statistically displaying the aggregate result of interest alone, instead of the daily or monthly report, on the display device 32. For example, FIG. 26 shows an example of a dangerous behavior detail graph, and FIG. 27 shows an example of a dangerous behavior list. With such graphs and lists, the contents of the dangerous behaviors alone can be grasped objectively. It should be appreciated that in addition to those shown in FIGS. 26 and 27, other aggregate lists may also be created as appropriate. For example, an embodiment may be achieved according to the present invention, wherein driving interruption places may be formatted as a list, which may be used as a list of destinations that the driver visited.

For aggregation, it is preferable that items that can be processed via the data processing section 38, input/output control section 35, and display device 32, e.g., the items of the operation control daily report, safety control daily report, dangerous behavior monthly report, etc. are presented to the human analyzer on the menu screens associated with their relevant subroutines. In this case, when the analyzer selects a desired item, the aggregate processing for the selected item is automatically activated and executed.

The digital information for forming the afore-described functional blocks 36–39 and functional modules 381–385 is typically stored in a fixed disk of a computer, and is read and executed by the CPU of the computer as needed. However, because the present invention may be implemented as far as the afore-described functional block 36, etc. are formed during operation, the recording format and medium thereof may be arbitrary. For example, a portable recording medium detachable from the computer unit, such as CD-ROM (compact disc read-only memory), DVD (digital versatile disc), optical disc, flexible disc, and semiconductor memory, may also be acceptable. Additionally, it may also be stored in a computer-readable fashion in a program server, etc., that is connected to a local area network (LAN), so that it may be installed in the afore-described fixed disk when used.

Furthermore, cases where not only are the functional blocks 36, etc. are formed only by digital information stored in the recording medium, but also a portion of the digital information accesses the function of the OS to form the afore-described functional block 36, etc. are also within the scope of the invention.

So far described is an example of operation control system in its simple form. An operation control system with added value may also be configured by adding various units and systems having optional functions.

For example, an image processing system may be added, wherein an image capture device that captures scene images around the vehicle is mounted onboard the vehicle along with the data recorder, so that when an event occurs, the image capture device automatically captures scene images at that time, which are endlessly stored in a rewritable disc as digital information. Then, in response to an input of a desired event occurrence time, the scene image data at that occurrence time is read to provide scene images.

So configured, when a behavior feature of interest is found during driving tendency analysis, for example, it would be easier to objectively understand its driving condition. An nearly equivalent benefit is also achieved by performing image processing based on the measurement data whenever an occasion arises and storing the resulting image data, instead of mounting the image capture device onboard.

An image processing means may also be added which identifies data that represents at least driving interruptions and their occurrence places from the measurement data recorded and superimposes on the map image the driving history including the places where the vehicle driving was interrupted based on the data identified. Because this permits the driving history to be superimposed on the map image displayed by the afore-described map information management system 34, the vehicle driving routes can be visually recognized. Furthermore, by analyzing the driving tendency while viewing the driving routes, it is possible to objectively check the causal relationship of that tendency.

It may also be configured so that it detects when the human analyzer clicks on a portion of the start or end place in the daily report after aggregation and loads geographical name data, etc. for the clicked location onto the map image. This may be readily implemented by linking the location information to the map image data in advance and providing a capability of activating a presentation process associated with the map image in response to the reading of that data.

In this way, with the operation control system 1 of the present embodiment, it is possible to reliably ascertain the presence/absence of dangerous handling and accelerating operations and backward driving, etc. as actual behaviors in the real-world traffic situation and to comprehensively judge the driving tendency on a driver-by-driver basis, which would not have been possible with this type of prior art system. Thus, precautions can be taken against possible traffic accidents. Additionally, when an actual traffic accident happens, the results of analysis for its causes can be made more objective, while allowing for analysis of correlation between driving tendency and traffic accident, driver's fatigue, and other factors.

The aggregate results related to the vehicle operation are automatically created in the form of daily report or monthly report, and information regarding places is replaced by geographical name data. Thus, the task required for control operation can be simplified, and the aggregate results can be efficiently utilized. Furthermore, because the aggregate results may be represented as graphs and lists, the driving tendency for each driver and its causal relationship can be represented in a more versatile manner.

The correlation between the driving tendency and fuel consumption tendency can be quantified and ascertained beforehand on a driver-by-driver basis, it is easy to take measures for minimizing the amount of fuel consumption.

As may be clear from the above description, the present invention permits the driving tendency of the vehicle to be analyzed on a driver-by-driver basis and evaluated objectively.

The results of implementation of the present invention may be used not only by the driver himself, a corporate manager in charge of operation control, and so on to judge the driving tendency, but also by persons engaged in insurance business related to the vehicle to examine a insurance policy for the third party (in this case, insured person) or to analyze the causes of actual traffic accidents. Furthermore, when a privately-owned car is used for business purposes, or when a company-owned car is used for private purposes, separate daily reports for private and business purposes may be created for the same vehicle, so that it may be used for both purposes. Additionally, the daily report may be created only for business purposes, whereas only the driving distance may be counted for private purposes; and it may be made easier to hand over the process of automatic cost calculation and payment depending on the driving distance for private and business purposes, respectively.

Thus, according to the present invention, the applicability of a recorder and a system that employs it is extended, with great contributions to progress in this type of technology.

What is claimed is:

1. A data recorder, comprising:
    a media accommodating mechanism for detachably accommodating a recording medium;
    a sensor unit for measuring, in chronological order, driving speed, three-dimensional angular velocity, and longitudinal/lateral acceleration of a vehicle; and a recorder unit for recording the measurement data obtained from the sensor unit and processed data thereof in the recording medium accommodated in said medium accommodating mechanism, wherein said recorder unit, upon recognizing that a behavior occurs when a variation range of said measurement data exceeds a predetermined threshold, records the measurement data at a time of behavior occurrence and for a predetermined time before and after that time of behavior occurrence; records, according to changes in the driving condition, time and location information at a time of such changes; updates an absolute maximum value when an absolute maximum value of new measurement data exceeds that of already recorded measurement data; and calculates an average value of said measurement data whenever a predetermined period has elapsed, and records the average value together with absolute maximum and absolute minimum values within said predetermined period.

2. The data recorder according to claim 1, wherein:

if said vehicle has stopped for more than a certain period of time, said recorder unit records the measurement data during stopping at intervals that are several bit multiples of the measurement data during driving.

3. The data recorder according to claim 1, wherein:

said recording medium is a card-like recording medium that stores data for identifying a vehicle and its driver, and operation purpose information including information indicative of whether for business or private purposes and/or whether for toll-free road or toll highway, which is both read when reading the measurement data recorded, and is configured so that it prompts a predetermined data processing means for different styles of data processing according to said operation purpose information, regardless of the same behavior features for the same vehicle.

4. An operation control assisting apparatus, comprising:

a data reading means for reading recorded data from a recording medium where measurement data indicative of features of behavior of a vehicle is recorded as linked to data indicative of occurrence date/time and occurrence place of the behavior;

a criteria setting means for setting data criteria indicative of predetermined behavior features; and a data processing means for extracting said recorded data read by said data reading means that match said set data criteria, classifying the extracted data according to behavior features, and aggregating the classified data per a predetermined period, said data processing means also replacing said occurrence place data linked to the aggregated data with geographical name data, and outputting said aggregated data in a visually-recognizable manner for use in operation control of said vehicle and driver thereof.

5. The operation control assisting apparatus according to claim 4, wherein:

said criteria setting means permits entering into an embedded area of a guidance displayed on a predetermined setup screen, criteria patterns for identifying behavior features of the vehicle, including dangerous behaviors.

6. The operation control assisting apparatus according to claim 4, wherein:

said criteria setting means permits entering into an embedded area of a guidance displayed on a predetermined setup screen, criteria patterns for identifying driving habits.

7. The operation control assisting apparatus according to claim 4, wherein:

said data processing means compares s aid recorded data to said data criteria indicative of features of driving interruptions, thereby identifying the time and place of occurrence of the driving interruptions and generating, in chronological order, geographical name data corresponding to the place of the driving interruptions identified.

8. An operation control assisting apparatus, comprising:

a data reading means for reading measurement data from a recording medium where measurement data indicative of behavior features of a vehicle, including its driving speed, is recorded; and a data processing means for classifying said measurement data read by said data reading means into a plurality of driving speed ranges and detecting the behavior of said vehicle in each of the speed ranges according to the classified measurement data, said data processing means also generating judgment information for judging the driving tendency of a driver of the vehicle in an ex post facto way based on the results of the detection, so that the judgment information is outputted in a visually-recognizable manner and used for operation control of said vehicle and the driver thereof.

9. The operation control assisting apparatus according to claim 8, wherein:

said data processing means performs at least one of correlation analysis or multivariate analysis between dissimilar measurement data, thereby generating said judgment information.

10. The operation control assisting apparatus according to claim 9, wherein:

one of said measurement data to be processed includes kinetic acceleration data in a predetermined direction of said vehicle.

11. The operation control assisting apparatus according to claim 8, wherein:

said data processing means compares statistical values of the classified data about the recorded data for a plurality of drivers to similar data of a target driver to be analyzed, thereby generating said judgment information regarding said target driver.

12. The operation control assisting apparatus according to claim 8, wherein:

said data processing means compares classified data about a specific reference driver exhibiting a specific driving tendency to similar data about a target driver to be analyzed, thereby generating said judgment information regarding said target driver.

13. The operation control assisting apparatus according to claim 12, wherein:

said reference driver is a driver exhibiting relatively less data indicative of features of dangerous behavior.

14. The operation control assisting apparatus according to claim 8, wherein:

said data processing means includes a fuel consumption tendency analysis module that creates data indicative of driving efficiency based on said judgment data for individual drivers and quantitatively identifies fuel consumption tendencies of said drivers.

15. The operation control assisting apparatus according to claim 14, wherein:

said fuel consumption tendency analysis module creates data indicative of said efficiency by using, as variables, driving tendency elements of a driver including idling time of the vehicle and its driving speed and acceleration variability derived by analyzing said behavior features.

16. An operation control system having a data recorder and an operation control assisting apparatus, wherein:

said data recorder comprising:

a media accommodating mechanism for detachably accommodating a recording medium;

a sensor unit for measuring, in chronological order, driving speed, three-dimensional angular velocity, and longitudinal/lateral acceleration of a vehicle; and a recorder unit for recording the measurement data obtained from the sensor unit and processed data thereof in the recording medium accommodated in said medium accommodating mechanism, wherein said recorder unit, upon recognizing that a behavior occurs when a variation range of said measurement data exceeds a predetermined threshold, records the measurement data at a time of behavior occurrence and for a predetermined time before and after that time of behavior occurrence; records, according to changes in the driving condition, time and location information at a time of such changes; updates and absolute maximum value when an absolute maximum value of new measurement data exceeds that of already recorded measurement data; and calculates an average value of said measurement data whenever a predetermined period has elapsed, and records the average value together with absolute maximum and minimum values within said predetermined period;

said operation control assisting apparatus comprising:

a data reading means for reading recorded data from a recording medium where measurement data indicative of features of behavior of the vehicle is recorded as linked to data indicative of occurrence date/time and occurrence place of the behavior;

a criteria setting means for setting data criteria indicative of predetermined behavior features;

a first data processing means for extracting said recorded data read by said data reading means that match said set data criteria, classifying the extracted data according to behavior features, and aggregating the classified data per a predetermined period, said first data processing means also replacing said occurrence place data linked to the aggregated data with geographical name data; and a second data processing means generating judgement information indicative of driving tendency of a drive based on the measurement data indicative of behavior features of the vehicle including its driving speed.

17. The operation control system according to claim 16, further comprising:

an image data storage means for storing image data representing scenes around said vehicle; and an image processing means for reading, upon input of a time of occurrence of a desired behavior feature, said scene image data at said time of occurrence, thereby embodying the scene image.

18. The operation control system according to claim 16, further comprising:

an image processing means for visualizing a driving route of said vehicle by identifying at least driving interruption and an place of occurrence thereof from the measurement data recorded by said data recorder and comprehensively displaying on a predetermined map image a driving history including the place of driving interruption of the vehicle equipped with said data recorder.

19. A computer-readable recording medium where digital information is stored for causing a computer unit to execute the steps of:

reading recorded data from a recording medium where measurement data indicative of features of behavior of a vehicle is recorded as linked to data indicative of occurrence date/time and occurrence place of the behavior;

setting data criteria indicative of predetermined behavior features;

extracting said recorded data read that match said set data criteria and classifying the extracted data according to behavior features;

aggregating the classified data per a predetermined period;

replacing said occurrence place data lined to the aggregated data with geographical name data; and outputting the aggregated data in a visually-recognizable manner.

20. A computer-readable recording media where digital information is stored for causing a computer unit to execute the steps of:

reading recorded data from a recording medium where measurement data indicative of features of behavior of a vehicle including its driving speed is recorded;

classifying said recorded data read according a plurality of driving speed ranges;

detecting the behavior of said vehicle in each speed range based on the classified measurement data;

creating judgment information for judging the driving tendency of a driver of said vehicle in an ex post facto way based on the results of the detection; and outputting the judgment information in a visually-recognizable manner.

* * * * *